(12) United States Patent
Descroix et al.

(10) Patent No.: US 11,292,985 B2
(45) Date of Patent: *Apr. 5, 2022

(54) ASSOCIATIVE AND EXCHANGEABLE OLIGOMERS, AND COMPOSITION CONTAINING SAME

(71) Applicant: TOTAL MARKETING SERVICES, Puteaux (FR)

(72) Inventors: Gregory Descroix, Brindas (FR); Fanny Briand, Lyons (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/058,439

(22) PCT Filed: May 23, 2019

(86) PCT No.: PCT/FR2019/051191
§ 371 (c)(1),
(2) Date: Nov. 24, 2020

(87) PCT Pub. No.: WO2019/224494
PCT Pub. Date: Nov. 28, 2019

(65) Prior Publication Data
US 2021/0214638 A1    Jul. 15, 2021

(30) Foreign Application Priority Data

May 24, 2018  (FR) .................................... 1854409

(51) Int. Cl.
*C10M 141/12* (2006.01)
*C10M 129/76* (2006.01)
(Continued)

(52) U.S. Cl.
CPC ........ *C10M 141/12* (2013.01); *C10M 129/76* (2013.01); *C10M 139/00* (2013.01);
(Continued)

(58) Field of Classification Search
CPC .............. C10M 141/12; C10M 129/76; C10M 139/00; C10M 169/04; C10M 2203/003;
(Continued)

(56) References Cited

U.S. PATENT DOCUMENTS 5,691,284 A     11/1997  Beyer et al.
10,005,900 B2 *  6/2018  Leibler ................. C08F 220/16
(Continued)

OTHER PUBLICATIONS

Oct. 23, 2019 International Search Report issued in International Patent Application No. PCT/FR2019/051191.
(Continued)

*Primary Examiner* — Ellen M McAvoy
(74) *Attorney, Agent, or Firm* — Oliff PLC

(57) ABSTRACT

Compositions are obtained by mixing at least one oligomer A1, which is obtained by copolymerizing at least two monomers functionalized by diol functions with at least one second monomer, with at least one compound A2 having at least two boron ester functions. The compositions exhibit very varied rheological properties depending on the proportion of the compounds A1 and A2 used. A composition is also obtained by mixing at least one lubricating oil with such a composition of associative and exchangeable polymers, and the use of this composition to lubricate a mechanical part.

20 Claims, 5 Drawing Sheets

Figure 1:
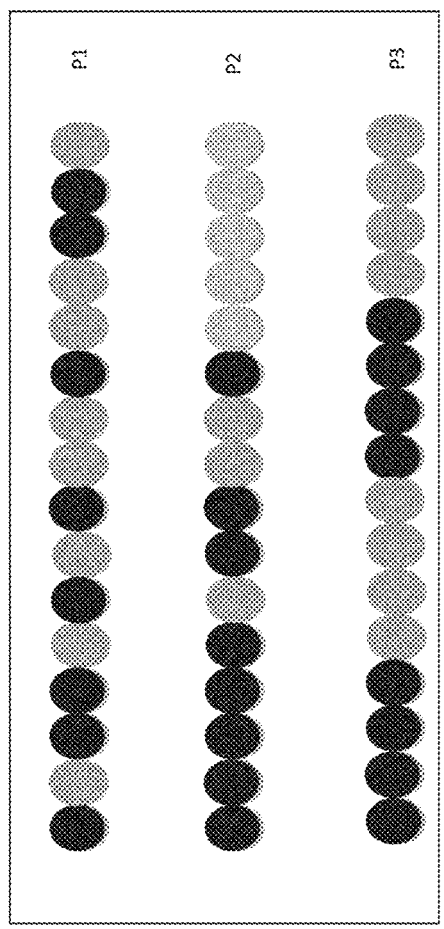

(51) Int. Cl.
  *C10M 139/00* (2006.01)
  *C10M 169/04* (2006.01)
  *C10N 30/00* (2006.01)
  *C10N 20/04* (2006.01)
  *C10N 40/25* (2006.01)

(52) U.S. Cl.
  CPC .... *C10M 169/04* (2013.01); *C10M 2203/003* (2013.01); *C10M 2207/286* (2013.01); *C10M 2227/062* (2013.01); *C10N 2020/04* (2013.01); *C10N 2030/54* (2020.05); *C10N 2040/25* (2013.01)

(58) Field of Classification Search
  CPC ...... C10M 2207/286; C10M 2227/062; C10N 2030/54; C10N 2020/04; C10N 2040/25
  See application file for complete search history.

(56) References Cited

U.S. PATENT DOCUMENTS

| | | | |
|---|---|---|---|
| 10,011,711 B2* | 7/2018 | Leibler | C08F 220/30 |
| 10,336,960 B2* | 7/2019 | Nguyen | C10M 145/14 |
| 10,377,844 B2* | 8/2019 | Nguyen | C10M 145/14 |
| 10,508,250 B2* | 12/2019 | Nicolay | C10M 169/044 |
| 2017/0009176 A1 | 1/2017 | Nguyen et al. | |
| 2018/0023028 A1 | 1/2018 | Nicolay et al. | |
| 2020/0399412 A1* | 12/2020 | Descroix | C08F 230/06 |
| 2020/0399415 A1* | 12/2020 | Descroix | C08F 212/12 |
| 2021/0171679 A1* | 6/2021 | Descroix | C08L 43/00 |
| 2021/0198593 A1* | 7/2021 | Descroix | C08L 43/00 |

OTHER PUBLICATIONS

Oct. 23, 2019 Written Opinion issued in International Patent Application No. PCT/FR2019/051191.

* cited by examiner

ASSOCIATIVE AND EXCHANGEABLE OLIGOMERS, AND COMPOSITION CONTAINING SAME

The invention relates to a composition resulting from the mixing of at least one oligomer A1, functionalized with diol functions and optionally comprising repeating units corresponding to at least one styrene monomer, and at least one compound A2 comprising at least two boronic ester functions. Such compositions have very varied rheological properties depending on the proportion of the compounds A1 and A2 used. The invention also relates to a composition resulting from the mixing of at least one lubricant oil with such a composition and to the use of this composition for lubricating a mechanical part. The field of the invention is that of exchangeable associative polymers and that of lubricants. The lubricant composition according to the invention has good fuel-saving properties but also good resistance to mechanical degradation.

PRIOR ART

High molar mass polymers are widely used for increasing the viscosity of solutions in many fields, such as the petroleum, paper and water treatment industries, the mining industry, the cosmetics and textile industries and in general in all the industrial techniques using thickened solutions.

Lubricant compositions, and more particularly engine lubricant compositions, are known for being able to comprise various types of additives, giving the composition particular properties. Following the establishment of the Kyoto Protocol, new environmental protection standards compel the motor vehicle industry to construct vehicles whose pollutant emissions and fuel consumption are reduced. As a result, the engines of these vehicles are subjected to increasingly stringent technical constraints: they notably rotate faster, at increasingly high temperatures, and must consume increasingly less fuel. The nature of the engine lubricants for motor vehicles has an influence on the emission of pollutants and on the fuel consumption. Energy-saving or "fuel-eco" motor vehicle engine lubricants have been developed to meet these new needs.

Patent applications WO2015/110642, WO2015/110643 and WO2016/113229 disclose a composition resulting from the mixing of at least one copolymer A1 resulting from the copolymerization of at least one monomer functionalized with diol functions and of at least one compound A2 comprising at least two boronic ester functions. These compounds can associate, to optionally form a gel, and to exchange chemical bonds thermoreversibly. These additives have the advantage of reducing the drop in viscosity of the solution comprising them when the temperature increases. These polymer compositions have very varied rheological properties depending on the proportion of the compounds A1 and A2 used. They may also comprise a diol compound which makes it possible to better control the association of the two copolymers.

In particular, these polymer compositions may be added to a lubricant oil to lubricate a mechanical part. These copolymers make it possible to formulate lubricant compositions whose viscosity is better controlled when compared with the lubricant compositions of the prior art. In particular, when they are introduced into a base oil, these copolymers have a tendency to reduce the drop in viscosity of the mixture when the temperature increases. The presence of a diol compound in these lubricant compositions makes it possible to better modulate their viscosity.

Lubricant compositions are compositions applied between surfaces, notably metal surfaces, of moving parts. They make it possible to reduce the friction and the wear between two parts in contact and in motion relative to each other. They also serve to dissipate part of the thermal energy generated by this friction. Lubricant compositions form a protective film between the surfaces of the parts onto which they are applied.

The compositions used for lubricating mechanical parts are generally formed from a base oil and additives. The base oil, which is notably of petroleum or synthetic origin, shows viscosity variations when the temperature is varied.

Specifically, when the temperature of a base oil increases, its viscosity decreases, and when the temperature of the base oil decreases, its viscosity increases. Now, in a hydrodynamic lubrication regime, the thickness of the protective film is proportional to its viscosity, and thus also depends on the temperature. A composition has good lubricant properties if the thickness of the protective film remains substantially constant irrespective of the conditions and the duration of use of the lubricant.

In an internal combustion engine, a lubricant composition may be subjected to external or internal temperature changes. The external temperature changes are due to variations in the temperature of the ambient air, for instance variations in temperature between summer and winter. The internal temperature changes result from the running of the engine. The temperature of an engine is lower during its start-up phase, notably in cold weather, than during prolonged use. Consequently, the thickness of the protective film may vary in these different situations.

There is thus a need to provide a lubricant composition which has good lubricant properties and whose viscosity is sparingly subject to temperature variations.

It is known practice to add additives that improve the viscosity of a lubricant composition. The function of these additives is to modify the rheological behavior of the lubricant composition. They make it possible to promote greater stability of the viscosity over a temperature range within which the lubricant composition is used. For example, these additives limit the reduction in viscosity of the lubricant composition when the temperature rises, while at the same time limiting the increase in viscosity under cold conditions.

Additives for enhancing the viscosity (or additives for enhancing the viscosity index) ensure good lubrication by limiting the impact on the viscosity under cold conditions and by ensuring a minimum thickness of the film under hot conditions. The viscosity-enhancing additives currently used are polymers such as olefin copolymers (OCP) and polyalkyl methacrylates (PMA). These polymers have high molar masses. In general, the contribution of these polymers toward controlling the viscosity is proportionately greater the higher their molecular weight.

However, high molar mass polymers have the drawback of having poor permanent shear strength when compared with polymers of the same nature and of the same architecture but of smaller size.

Now, a lubricant composition is subjected to high shear stresses notably in internal combustion engines, where the friction surfaces have a very small separation and the pressures exerted on the parts are high. These shear stresses on high molar mass polymers lead to cleavages in the macromolecular chains. The polymer thus degraded undergoes a reduction in its thickening properties, and the viscosity drops irreversibly. This low permanent shear strength thus leads to degradation of the lubricant properties of the lubricant composition.

Finally, it has been sought to develop compositions which have better oxidation stability, in particular better resistance to oxidation by free radicals.

The compositions described in patent applications WO 2015/110642, WO 2015/110643 and WO 2016/113229 have very advantageous properties, as a result of their capacity to form thermoreversible associations. However, it has been found that, under certain conditions, notably high temperature conditions, the associative behavior of these copolymers decreased. In particular, a reduction in the viscosity index of lubricant compositions comprising them, and poorer resistance to cycling (which may be defined as the succession of sequences of raising and lowering of the temperature as is observed in an engine), leading to a loss of the lubricant properties over time, have been observed.

Thus, the Applicant set itself the objective of preparing novel copolymers which have improved properties when compared with the copolymers of the prior art.

This objective is achieved by means of novel rheological additives which can associate, optionally to form a gel, and which can be exchanged. The additives of the present invention have the advantage of thickening the medium in which they are dispersed, and they maintain this advantage at high temperatures, for instance up to 150° C. These additives show resistance to chemical degradation during a temperature increase when compared with the additives of the prior art. Lubricant compositions comprising them show better stability of their cycling performance and better reproducibility of the lubricant properties over time.

This characteristic results from the combined use of two particular compounds, an oligomer bearing diol functions and optionally styrene functions and a compound comprising boronic ester functions.

It is possible, by means of the compositions of the invention, to provide lubricant compositions which have good lubricant properties during the start-up phases of an engine (cold phase) and good lubricant properties when the engine is running at its service temperature (hot phase). These lubricant compositions make it possible to reduce the fuel consumption of a vehicle in which they are used. They allow better resistance to mechanical degradation than the compositions of the prior art.

SUMMARY OF THE INVENTION

The invention relates to a composition resulting from the mixing of at least
- a polydiol oligomer A1 with a number-average molar mass of greater than or equal to 600 g/mol and less than 10 000 g/mol, comprising repeating units corresponding to:
  at least two monomers M1,
  and
  more than 50 mol % of repeating units corresponding to one or more monomers M3, and
  optionally at least one monomer M2,
  and
- a compound A2 comprising at least two boronic ester functions,
the monomer M1 corresponding to the general formula (I):

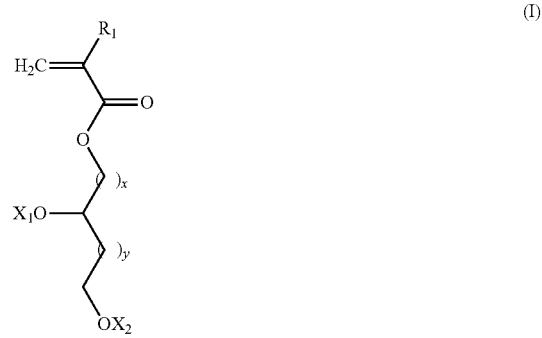

in which:
R$_1$ is chosen from the group formed by —H, —CH and —CH$_2$—CH$_3$;
x is an integer ranging from 1 to 18, preferably from 2 to 18;
y is an integer equal to 0 or 1;
X$_1$ and X$_2$, which may be identical or different, are chosen from the group formed by hydrogen, tetrahydropyranyl, methyloxymethyl, tert-butyl, benzyl, trimethylsilyl and t-butyldimethylsilyl;
or
X$_1$ and X$_2$ form, with the oxygen atoms, a bridge having the following formula

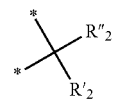

in which:
the asterisks (*) symbolize the bonds to oxygen atoms,
R'$_2$ and R"$_2$, which may be identical or different, are chosen from the group formed by hydrogen and a C$_1$-C$_{11}$ alkyl, preferably methyl;
or
X$_1$ and X$_2$ form, with the oxygen atoms, a boronic ester having the following formula:

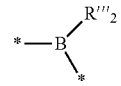

in which:
the asterisks (*) symbolize the bonds to oxygen atoms,
R'''$_2$ is chosen from the group formed by a C$_6$-C$_{30}$ aryl, a C$_1$-C$_{30}$ aralkyl and a C$_2$-C$_{30}$ alkyl, preferably a C$_6$-C$_{18}$ aryl;
the monomer M2 corresponding to the general formula (II):

in which:
R$_2$ is chosen from the group formed by —H, —CH and —CH$_2$—CH$_3$;
R$_3$ is chosen from the group formed by: —C(O)—O—R'$_3$; —O—R'$_3$; —S—R'$_3$ and —C(O)—N(H)—R'$_3$ with R'$_3$ a C$_1$-C$_{30}$ alkyl group,
the monomer M3 corresponding to the general formula (X):

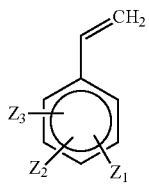

(X)

in which:
Z$_1$, Z$_2$ and Z$_3$, which may be identical or different, represent groups chosen from a hydrogen atom, a C$_1$-C$_{12}$ alkyl, and a group —OZ' or —C(O)—O—Z' with Z' being a C$_1$-C$_{12}$ alkyl.

According to a preferred embodiment, the oligomer A1 has a number-average molar mass ranging from 600 g/mol to 9500 g/mol.

According to a preferred embodiment, A1 comprises from 55 mol % to 95 mol % of repeating units corresponding to one or more monomers M3 of general formula (X).

According to a preferred embodiment, the monomer M3 is styrene.

According to a preferred embodiment, the side chains of the oligomer A1 have a mean length ranging from 8 to 20 carbon atoms, preferably from 9 to 18 carbon atoms.

According to a preferred embodiment, the oligomer A1 has a molar percentage of repeating units corresponding to the monomer M1 of formula (I) in said copolymer ranging from 1% to less than 50%, preferably from 5% to 45%.

According to a preferred embodiment, the oligomer A1 has a number-average degree of polymerization ranging from 3 to 100, preferably from 3 to 50.

According to a preferred embodiment, the oligomer A1 has a polydispersity index (Ip) ranging from 1.05 to 4.0, preferably ranging from 1.10 to 3.8.

According to a first preferred embodiment, compound A2 is a compound of formula (III):

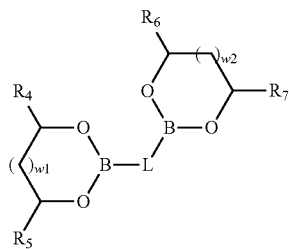

(III)

in which:
w$_1$ and w$_2$, which may be identical or different, are integers chosen between 0 and 1;
R$_4$, R$_5$, R$_6$ and R$_7$, which may be identical or different, represent a group chosen from a hydrogen atom, a hydrocarbon-based group comprising from 1 to 30 carbon atoms, preferably between 4 and 18 carbon atoms and even more preferentially between 6 and 14 carbon atoms, said hydrocarbon-based group being optionally substituted with one or more groups chosen from: a hydroxyl, a group —OJ or —C(O)—O-J with J being a hydrocarbon-based group comprising from 1 to 24 carbon atoms;
L is a divalent bonding group chosen from the group formed by a C$_6$-C$_{18}$ aryl, a C$_7$-C$_{24}$ aralkyl and a C$_2$-C$_{24}$ hydrocarbon-based chain.

According to another preferred embodiment, compound A2 is an oligomer resulting from the copolymerization of at least two monomers M4 of formula (IV):

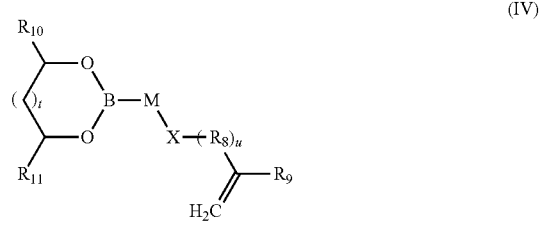

(IV)

in which:
t is an integer equal to 0 or 1;
u is an integer equal to 0 or 1;
M and R$_8$ are identical or different divalent bonding groups, chosen from the group formed by a C$_6$-C$_{18}$ aryl, a C$_7$-C$_{24}$ aralkyl and a C$_2$-C$_{24}$ alkyl, preferably a C$_6$-C$_{18}$ aryl,
X is a function chosen from the group formed by —O—C(O)—, —C(O)—O—, —C(O)—N(H)—, —N(H)—C(O)—, —S—, —N(H)—, —N(R'$_4$)— and —O— with R'$_4$ being a hydrocarbon-based chain comprising from 1 to 15 carbon atoms; R$_9$ is chosen from the group formed by —H, —CH$_3$ and —CH$_2$—CH$_3$;
R$_{10}$ and R$_{11}$, which may be identical or different, represent a group chosen from a hydrogen atom, a hydrocarbon-based group comprising from 1 to carbon atoms, preferably between 4 and 18 carbon atoms and even more preferentially between 6 and 14 carbon atoms, said hydrocarbon-based group being optionally substituted with one or more groups chosen from: a hydroxyl, a group —OJ or —C(O)—O-J with J being a hydrocarbon-based group comprising from 1 to 24 carbon atoms; with
optionally at least one monomer M5 of general formula (V):

(V)

in which:
R$_{12}$ is chosen from the group formed by —H, —CH$_3$ and —CH$_2$—CH$_3$, R$_{13}$ is chosen from the group formed by —C(O)—O—R'$_{13}$; —O—R'$_{13}$, —S—R'$_{13}$ and —C(O)—N(H)—R'$_{13}$, with R'$_{13}$ a C$_1$-C$_{30}$ alkyl group, optionally at least one monomer M3 of general formula (X):

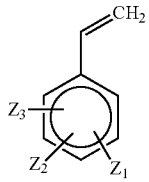
(X)

in which:
Z₁, Z₂ and Z₃, which may be identical or different, represent groups chosen from a hydrogen atom, a $C_1$-$C_{12}$ alkyl, and a group —OZ' or —C(O)—O—Z' with Z' being a $C_1$-$C_{12}$ alkyl.

According to a preferred embodiment, the oligomer A2 has a number-average molar mass ranging from 600 g/mol to less than 10 000 g/mol, preferably from 600 to 9500 g/mol, better still from 600 to 5000 g/mol.

According to a preferred embodiment, in the oligomer A2, at least one of the following two conditions is met:
either, in formula (IV): u=1, $R_9$ is H and $R_8$ represents a $C_6$-$C_{18}$ aryl or a $C_1$-$C_{24}$ aralkyl and the double bond of the monomer M4 of formula (IV) is directly connected to the aryl group;
or, copolymer A2 comprises at least one monomer M3 of formula (X).

Advantageously, when A2 comprises a monomer M3 of formula (X), this monomer M3 is styrene.

Advantageously, the boronic ester oligomer A2 has a molar percentage of styrene monomer(s), advantageously of styrene, of formula (IV) and/or (X), in said copolymer ranging from 2 mol % to 50 mol %, preferentially from 3 mol % to 40 mol % and more preferably from 5 mol % to 35 mol %.

According to an advantageous embodiment, in the oligomer A2, the chain formed by the sequence of groups $R_{10}$, M, X and $(R_8)_u$ with u equal to 0 or 1 of the monomer of formula (IV) has a total number of carbon atoms ranging from 8 to 38, preferably from 10 to 26.

According to an advantageous embodiment, the side chains of the oligomer A2 have a mean length of greater than or equal to 8 carbon atoms, preferably ranging from 11 to 16 carbon atoms.

According to an advantageous embodiment, the oligomer A2 has a molar percentage of monomer M4 of formula (IV) in said oligomer ranging from 4% to 50% and preferably from 4% to 30%.

According to an advantageous embodiment, the oligomer A2 has a number-average degree of polymerization ranging from 2 to 100, preferably from 2 to 50.

According to an advantageous embodiment, the oligomer A2 has a polydispersity index (Ip) ranging from 1.04 to 3.54, preferably ranging from 1.10 to 3.10.

According to a preferred embodiment, the content of oligomer A1 ranges from 0.1% to 50% by weight relative to the total weight of the composition.

According to a preferred embodiment, the content of compound A2 ranges from 0.1% to 50% by weight relative to total weight of the composition.

According to a preferred embodiment, the mass ratio between the oligomer A1 and compound A2 (ratio A1/A2) ranges from 0.002 to 500, preferably from 0.05 to 20 and even more preferably from 0.1 to 10.

According to a preferred embodiment, the oligomer A1 has been obtained via a process comprising at least:
one step of radical polymerization controlled by reversible addition-fragmentation chain transfer in the presence of a transfer agent of thiocarbonylthio type.

According to a more preferred embodiment, the oligomer A1 has been obtained via a process comprising at least, after the polymerization:
a step of aminolysis of the thiocarbonylthio residue to thiol, followed by
a Michael addition on an acrylate to transform the thiol into a thioether.

According to a preferred embodiment, the composition also comprises at least one exogenous compound A4 chosen from polyols.

According to a preferred embodiment, the molar percentage of exogenous compound A4 relative to the boronic ester functions of compound A2 ranges from 0.025% to 5000%, preferably from 0.1% to 1000%, even more preferably from 0.5% to 500%, even more preferably from 1% to 150%.

According to another preferred embodiment, the composition also comprises at least one exogenous compound A5 chosen from those corresponding to formula (XI):

(XI)

in which:
Q represents a group chosen from a hydrocarbon-based group comprising from 1 to 30 carbon atoms, optionally substituted with one or more groups chosen from: a hydroxyl, a group —OJ or —C(O)—O-J with J being a hydrocarbon-based group comprising from 1 to 24 carbon atoms;
$G_4$ and $G_5$, which may be identical or different, represent groups chosen from a hydrogen atom, a hydrocarbon-based chain comprising from 1 to 24 carbon atoms, a hydroxyl, a group —OJ or —C(O)—O-J with J being a hydrocarbon-based group comprising from 1 to 24 carbon atoms;
g represents 0 or 1.

According to a preferred embodiment, the molar percentage of exogenous compound A5 relative to the diol functions of the oligomer A1 ranges from 0.025% to 5000%, preferably from 0.1% to 1000%, even more preferably from 0.5% to 500% and even more preferably from 1% to 150%.

The invention also relates to a lubricant composition resulting from the mixing of at least:
a lubricant oil; and
a composition as defined above and as detailed in the description below.

According to a preferred embodiment, the lubricant oil is chosen from oils of group I, of group II, of group III, of group IV and of group V of the API classification, and a mixture thereof.

According to a preferred embodiment, the lubricant composition results from the mixing also with a functional additive chosen from the group formed by antioxidants, detergents, anti-wear additives, extreme-pressure additives, viscosity-index-enhancing polymers, pour-point improvers, antifoams, anticorrosion additives, thickeners, dispersants, friction modifiers, and mixtures thereof.

The invention also relates to a process for modulating the viscosity of a lubricant composition, the process comprising at least:
the provision of a composition as defined above and as detailed in the description below,
the mixing of this composition with a lubricant oil.

The invention also relates to the use of a lubricant composition as defined above and as detailed below, for reducing the fuel consumption of vehicles.

The invention also relates to the use of a lubricant composition as defined above and as detailed below, for increasing the mechanical durability of the lubricant.

The invention also relates to a process for reducing the energy losses by mechanical part friction, comprising at least one step of placing a mechanical part in contact with a lubricant composition as defined above and as detailed below.

The invention also relates to a process for reducing the fuel consumption of a vehicle, comprising at least one step of placing a mechanical part of the vehicle engine in contact with a lubricant composition as defined above and as detailed below.

DETAILED DESCRIPTION

The expression "consists essentially of" followed by one or more features means that, besides the components or steps explicitly listed, components or steps which do not significantly modify the properties and features of the invention may be included in the process or the material of the invention.

The expression "between X and Y" includes the limits, unless explicitly mentioned otherwise. This expression thus means that the targeted range comprises the values X and Y and all the values ranging from X to Y.

Definitions

The term "oligomer" means a macromolecule consisting of a limited number of repeating units. These repeating units may all be identical or an oligomer may comprise different repeating units. Generally, an oligomer comprises from 2 to 100 repeating units and a number-average molar mass of greater than or equal to 600 g/mol and less than or equal to 10 000 g/mol.

The term "copolymer" means a linear or branched oligomer or macromolecule having a sequence formed from several repeating units (or monomer units), of which at least two units have a different chemical structure.

The term "monomer unit" or "monomer" means a molecule that is capable of being converted into an oligomer or a macromolecule by combination with itself or with other molecules of the same type. A monomer denotes the smallest constituent unit whose repetition leads to an oligomer or a macromolecule.

The term "random oligomer or copolymer" means a macromolecule in which the sequential distribution of the monomer units obeys known statistical laws. For example, a copolymer or an oligomer is said to be random when it is formed by monomer units whose distribution is Markovian. A schematic random copolymer (P1) is illustrated in FIG. 1. The distribution of the monomer units in the polymer chain depends on the reactivity of the polymerizable functions of the monomers and on the relative concentration of the monomers.

The term "block copolymer or oligomer" means a macromolecule which comprises one or more blocks or which consists of blocks. The term "block" denotes a part of a copolymer comprising several identical or different monomer units and which has at least one constitutional or configurational feature allowing it to be distinguished from its adjacent parts. A schematic block copolymer (P3) is illustrated in FIG. 1.

A "gradient copolymer or oligomer" denotes a macromolecule of at least two monomer units of different structures, the monomer composition of which changes gradually along the chain, thus gradually passing from one end of the polymer chain which is rich in one monomer unit, to the other end which is rich in the other comonomer. A schematic gradient polymer (P2) is illustrated in FIG. 1.

The polydiol oligomers of the invention may be random oligomers or gradient oligomers or block oligomers.

The poly(boronic ester) oligomers of the invention may be random oligomers or gradient oligomers or block oligomers.

The term "copolymerization" means a process which makes it possible to convert a mixture of at least two monomer units of different chemical structures into an oligomer or a copolymer.

In the rest of the present patent application, "B" represents a boron atom.

The term "$C_i$-$C_j$ alkyl" means a linear or branched, saturated hydrocarbon-based chain, comprising from i to j carbon atoms. For example, the term "$C_1$-$C_{10}$ alkyl" means a linear or branched, saturated hydrocarbon-based chain comprising from 1 to 10 carbon atoms.

The term "$C_x$-$C_y$ aryl" means a functional group which is derived from an aromatic hydrocarbon-based compound comprising from x to y carbon atoms. This functional group may be monocyclic or polycyclic. By way of illustration, a $C_6$-$C_{18}$ aryl may be phenyl, naphthalene, anthracene, phenanthrene and tetracene.

The term "$C_x$-$C_y$ alkenyl" means a linear or branched hydrocarbon-based chain including at least one unsaturation, preferably a carbon-carbon double bond, and comprising from x to y carbon atoms.

The term "$C_x$-$C_y$ aralkyl" means an aromatic, preferably monocyclic, hydrocarbon-based compound substituted with at least one linear or branched alkyl chain and in which the total number of carbon atoms in the aromatic ring and in its substituents ranges from x to y carbon atoms. By way of illustration, a $C_1$-$C_{10}$ aralkyl may be chosen from the group formed by benzyl, tolyl and xylyl.

The term "$C_x$-$C_y$ aryl group substituted with a group Y" means an aromatic, preferably monocyclic, hydrocarbon-based compound comprising from x to y carbon atoms, at least one carbon atom of the aromatic ring of which is substituted with a group Y.

The term "Hal" or "halogen" means a halogen atom chosen from the group formed by chlorine, bromine, fluorine and iodine.

In the description, when it is indicated that a copolymer or an oligomer "comprises repeating units corresponding to a monomer $M_i$", this means that it may result directly from the copolymerization of the monomer $M_i$, and i represents an index identifying the various monomers illustrated below, with other comonomers, but also that it may have been obtained by copolymerization of monomers other than the monomers $M_i$ and may have subsequently been subjected to a chemical transformation step, so that the structural units it comprises are identical to those which would have been obtained by copolymerization of the monomer $M_i$. For example, a monomer bearing acid functionality, such as acrylic acid or methacrylic acid, may first be copolymerized with other monomers to form a copolymer, and then all or some of the acid functions may subsequently be transformed by any reaction, for example by means of an esterification reaction with an alkanol, or an amidation reaction with an alkylamine. A copolymer comprising repeating units corresponding to an alkyl acrylate or alkylacrylamide monomer will then be obtained.

The term "the copolymer/oligomer results directly or indirectly" means that the process for preparing the copolymer/oligomer may comprise one or more steps other than copolymerization, such as a deprotection step. Notably, in the case of diol oligomers, the copolymerization may optionally be followed by a step of deprotecting the diol functions.

Throughout the description, the following expressions are used without preference and equivalently: "the oligomer results, directly or indirectly, from the copolymerization" and "the oligomer results from the copolymerization".

Additive Composition According to the Invention

One subject of the present invention is a composition of exchangeable and associative compounds, this composition resulting from the mixing of at least:
- a polydiol oligomer A1 as described below or as may notably be obtained via one of the processes described below;
- a compound A2 comprising at least two boronic ester functions as described below.

This additive composition makes it possible to control and modulate the rheological behavior of a medium into which it is added. The medium may be a hydrophobic medium, notably an apolar medium, such as a solvent, a mineral oil, a natural oil or a synthetic oil.

Polydiol Oligomer A1

The polydiol oligomer A1 is a hydrocarbon-based macromolecule comprising at least two diol functions and optionally one or more oxygen-based, nitrogen-based or sulfur-based functions, for instance functions from among: carboxylic acid, ester, ether, amine, amide, thiol, thioether, thioester.

The polydiol oligomer A1 has a number-average molar mass of less than 10 000 g/mol. Advantageously, the polydiol oligomer A1 has a number-average molar mass of less than 9500 g/mol.

Preferably, the polydiol oligomer A1 has a number-average molar mass ranging from 600 g/mol to less than 10 000 g/mol, advantageously from 600 to 9500 g/mol.

The number-average molar mass is obtained by size exclusion chromatography measurement using poly(methyl methacrylate) calibration. The size exclusion chromatography measurement method using poly(methyl methacrylate) calibration is described in the publication (Fontanille, M.; Gnanou, Y., Chimie et physico-chimie des polymères [Chemistry and physical chemistry of polymers] 2nd ed.; Dunod: 2010; page 546).

The oligomer A1 comprises repeating units corresponding to monomers M1 of general formula (I).

The oligomer A1 may comprise repeating units corresponding to monomers M2 of general formula (II).

The oligomer A1 comprises repeating units corresponding to monomers M3 of general formula (X).

According to the invention, the oligomer A1 comprises more than 50 mol % of repeating units corresponding to one or more monomers M3 of general formula (X), advantageously from 55 mol % to 95 mol % of repeating units corresponding to one or more monomers M3 of general formula (X).

Advantageously also, the polydiol oligomer A1 has a number-average molar mass of less than 10 000 g/mol, advantageously less than 9500 g/mol. Preferably, A1 has a number-average molar mass ranging from 600 g/mol to less than 10 000 g/mol, advantageously from 600 to 9500 g/mol.

The oligomers of the invention may also comprise repeating units corresponding to the monomer M2.

According to a preferred embodiment, the polydiol oligomer A1 results, directly or indirectly, from the copolymerization of at least two monomers M1 bearing a diol function, and of at least one second monomer M3, of aromatic nature.

According to a preferred embodiment, the polydiol oligomer A1 results, directly or indirectly, from the copolymerization of at least two monomers M1 bearing a diol function, optionally of at least one second monomer M2, and of at least one third monomer M3.

Monomer M1

The monomer M1 has the general formula (I):

$$\text{(I)}$$

$$H_2C=\overset{R_1}{\underset{\underset{\underset{OX_2}{|}}{\underset{(\phantom{A})_y}{|}}}{\underset{X_1O-(\phantom{A})_x}{\overset{\overset{O}{\|}}{C}-O}}}$$

in which:
- $R_1$ is chosen from the group formed by —H, —CH and —CH$_2$—CH$_3$, preferably —H and —CH$_3$;
- x is an integer ranging from 1 to 18, preferably ranging from 2 to 18, more preferably from 3 to 8, even more preferably x is equal to 4;
- y is an integer equal to 0 or 1; preferably, y is equal to 0;
- $X_1$ and $X_2$, which may be identical or different, are chosen from the group formed by hydrogen, tetrahydropyranyl, methyloxymethyl, tert-butyl, benzyl, trimethylsilyl and t-butyldimethylsilyl;

or

- $X_1$ and $X_2$ form, with the oxygen atoms, a bridge having the following formula $$*\diagdown\underset{R'_2}{\overset{R''_2}{\diagup}}*$$

in which:
- the asterisks (*) symbolize the bonds to oxygen atoms,
- $R'_2$ and $R''_2$, which may be identical or different, are chosen from the group formed by hydrogen and a $C_1$-$C_{11}$ alkyl group;

or $X_1$ and $X_2$ form, with the oxygen atoms, a boronic ester having the following formula:

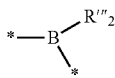

in which:
the asterisks (*) symbolize the bonds to oxygen atoms,
$R'''_2$ is chosen from the group formed by a $C_6$-$C_{30}$ aryl, a $C_7$-$C_{30}$ aralkyl and a $C_2$-$C_{30}$ alkyl, preferably a $C_6$-$C_{18}$ aryl, more preferably phenyl.

Preferably, when $R'_2$ and $R''_2$ are a $C_1$-$C_{11}$ alkyl group, the hydrocarbon-based chain is a linear chain. Preferably, the $C_1$-$C_{11}$ alkyl group is chosen from the group formed by methyl, ethyl, n-propyl, n-butyl, n-pentyl, n-hexyl, n-heptyl, n-octyl, n-nonyl, n-decyl and n-undecyl. More preferably, the $C_1$-$C_{11}$ alkyl group is methyl.

Preferably, when $R'''_2$ is a $C_2$-$C_{30}$ alkyl group, the hydrocarbon-based chain is a linear chain.

Among the monomers of formula (I), the monomers corresponding to formula (I-A) are among the preferred:

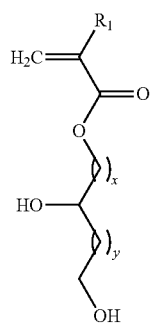

(I-A)

in which:
$R_1$ is chosen from the group formed by —H, —$CH_3$ and —$CH_2$—$CH_3$, preferably —H and —$CH_3$;
x is an integer ranging from 1 to 18, preferably ranging from 2 to 18, more preferably from 3 to 8, even more preferably x is equal to 4;
y is an integer equal to 0 or 1; preferably, y is equal to 0.

Among the monomers of formula (I), the monomers corresponding to formula (I-B) are among the preferred:

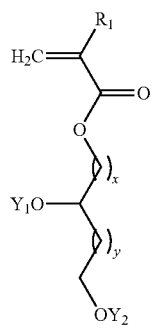

(I-B)

in which:
$R_1$ is chosen from the group formed by —H, —$CH_3$ and —$CH_2$—$CH_3$, preferably —H and —$CH_3$;
x is an integer ranging from 1 to 18, preferably ranging from 2 to 18, more preferably from 3 to 8, even more preferably x is equal to 4;
y is an integer equal to 0 or 1; preferably, y is equal to 0;
$Y_1$ and $Y_2$, which may be identical or different, are chosen from the group formed by tetrahydropyranyl, methyloxymethyl, tert-butyl, benzyl, trimethylsilyl and t-butyldimethylsilyl;

or $Y_1$ and $Y_2$ form, with the oxygen atoms, a bridge having the following formula:

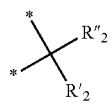

in which:
the asterisks (*) symbolize the bonds to oxygen atoms,
$R'_2$ and $R''_2$, which may be identical or different, are chosen from the group formed by hydrogen and a $C_1$-$C_{11}$ alkyl group;

or $Y_1$ and $Y_2$ form, with the oxygen atoms, a boronic ester having the following formula:

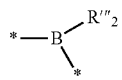

in which:
the asterisks (*) symbolize the bonds to oxygen atoms,
$R'''_2$ is chosen from the group formed by a $C_6$-$C_{30}$ aryl, a $C_7$-$C_{30}$ aralkyl and a $C_2$-$C_{30}$ alkyl, preferably a $C_6$-$C_{18}$ aryl, more preferably phenyl.

Preferably, when $R'_2$ and $R''_2$ are a $C_1$-$C_{11}$ alkyl group, the hydrocarbon-based chain is a linear chain. Preferably, the $C_1$-$C_{11}$ alkyl group is chosen from the group formed by methyl, ethyl, n-propyl, n-butyl, n-pentyl, n-hexyl, n-heptyl, n-octyl, n-nonyl, n-decyl and n-undecyl. More preferably, the $C_1$-$C_{11}$ alkyl group is methyl.

Preferably, when $R'''_2$ is a $C_2$-$C_{30}$ alkyl group, the hydrocarbon-based chain is a linear chain.

The synthesis of the polydiol oligomer (A1) may comprise the copolymerization of monomers (I-B) in protected form with other comonomers, followed by deprotection of the diol functions of the monomers (I-B).

Production of the Monomer M1

The monomer M1 of general formula (I) is obtained according to the methods described in WO2015/110642, WO2015/110643 and WO2016/113229.

Examples of synthesis of the monomers M1 are illustrated in the experimental section of patent applications WO2015/110642, WO2015/110643 and WO2016/113229.

Monomer M2

The monomer M2 has the general formula (II):

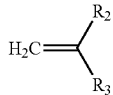

(II)

in which:
- R$_2$ is chosen from the group formed by —H, —CH$_3$ and —CH$_2$—CH$_3$, preferably —H and —CH$_3$;
- R$_3$ is chosen from the group formed by: —C(O)—O—R'$_3$; —O—R'$_3$; —S—R'$_3$ and —C(O)—N(H)—R'$_3$ with R'$_3$ a C$_1$-C$_{30}$ alkyl group.

Among the monomers of formula (II), the monomers corresponding to formula (I-A) are among the preferred:

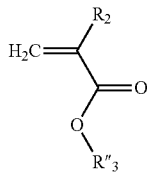

(II-A)

in which:
- R$_2$ is chosen from the group formed by —H, —CH$_3$ and —CH$_2$—CH$_3$, preferably —H and —CH$_3$;
- R''$_3$ is a C$_1$-C$_8$ alkyl group.

Among the monomers of formula (II), the monomers corresponding to formula (I-B) are also among the preferred:

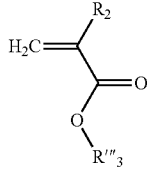

(II-B)

in which:
- R$_2$ is chosen from the group formed by —H, —CH and —CH$_2$—CH$_3$, preferably —H and —CH$_3$;
- R'''$_3$ is a C$_9$-C$_{30}$ alkyl group.

Production of the Monomer M2

The monomers of formulae (II), (II-A) and (II-B) are well known to those skilled in the art. They are sold by Sigma-Aldrich® and TCI®.

Monomer M3

The monomer M3 has the general formula (X):

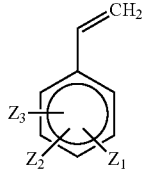

(X)

in which:
- Z$_1$, Z$_2$ and Z$_3$, which may be identical or different, represent groups chosen from a hydrogen atom, a C$_1$-C$_{12}$ alkyl, and a group —OZ' or —C(O)—O—Z' with Z' being a C$_1$-C$_{12}$ alkyl.

The term "C$_1$-C$_{12}$ alkyl group" means a linear or branched, saturated hydrocarbon-based chain containing from 1 to 12 carbon atoms. Preferably, the hydrocarbon-based chain is linear. Preferably, the hydrocarbon-based chain comprises from 1 to 6 carbon atoms.

Advantageously, Z$_1$, Z$_2$ and Z$_3$, which may be identical or different, represent groups chosen from a hydrogen atom, a C$_1$-C$_6$ alkyl, and a group —OZ' or —C(O)—O—Z' with Z' being a C$_1$-C$_6$ alkyl.

More preferably, Z$_1$, Z$_2$ and Z$_2$, which may be identical or different, represent groups chosen from a hydrogen atom, a C$_1$-C$_4$ alkyl, and a group —OZ' or —C(O)—O—Z' with Z' being a C$_1$-C$_4$ alkyl.

Among the preferred monomers M3, mention may be made of: styrene, para-tert-butylstyrene, para-methoxystyrene, para-acetoxystyrene and 2,4,6-trimethylstyrene.

According to a preferred embodiment, M3 is styrene.

Production of the Monomer M3

Certain monomers of formula (X), such as styrene, para-tert-butylstyrene, para-methoxystyrene, para-acetoxystyrene and 2,4,6-trimethylstyrene, are well known to those skilled in the art. They are notably sold by Sigma-Aldrich®. Other monomers may be prepared from these commercial monomers via synthetic methods that are well known to those skilled in the art.

Other Monomers

In addition to the repeating units detailed above corresponding to the monomers M1, M2 and M3, the oligomers A1 of the invention may comprise other repeating units derived from other comonomers, the proportion thereof being not more than 20% by weight, preferably not more than 10% by weight and more preferably not more than 5% by weight, based on the total weight of the repeating units of which the copolymer A1 is composed.

Process for Obtaining the Polydiol Oligomers A1

A person skilled in the art is capable of synthesizing the polydiol oligomers A1 on the basis of his general knowledge.

The copolymerization may be initiated in bulk or in solution in an organic solvent with free-radical-generating compounds. For example, the oligomers of the invention are obtained via the known processes of radical copolymerization, notably controlled radical copolymerization, such as the method known as reversible addition-fragmentation chain transfer (RAFT) controlled radical polymerization and the method known as atom-transfer radical polymerization (ATRP). Conventional radical polymerization and telomerization may also be employed to prepare the copolymers of the invention (Moad, G.; Solomon, D. H., *The Chemistry of Radical Polymerization.* 2nd ed.; Elsevier Ltd: 2006; page 639; Matyaszewski, K.; Davis, T. P. *Handbook of Radical Polymerization*; Wiley-Interscience: Hoboken, 2002; page 936).

To enable control of the oligomer chain length, use may be made of methods known to those skilled in the art, for instance: the use of chain-transfer agents, in particular mercaptans; control of the proportions of monomers as a function of their reactivity; the kinetics of introduction of the monomers; the reaction temperature. Such methods are notably described in U.S. Pat. Nos. 5,942,642, 5,691,284 and 4,009,195.

The polydiol oligomer A1 is advantageously prepared according to a preparation process which comprises at least one polymerization step (a) in which at least the following are placed in contact:
i) two monomers M1 of general formula (I) as described previously;
ii) optionally, at least one monomer M2 of formula (II) as described previously;
iii) at least one monomer M3 of general formula (X) as described previously;
iv) at least one source of free radicals.

In one embodiment, the process may also comprise v) at least one chain-transfer agent.

The term "a source of free radicals" means a chemical compound for generating a chemical species bearing one or more unpaired electrons in its outer shell. A person skilled in the art can use any source of free radicals known per se and suited to polymerization processes, notably controlled radical polymerization processes. Among the sources of free radicals that are preferred, by way of illustration, are benzoyl peroxide, tert-butyl peroxide, diazo compounds such as azobisisobutyronitrile, peroxygenated compounds such as persulfates or hydrogen peroxide, redox systems such as the oxidation of $Fe^{2+}$, persulfate/sodium metabisulfite mixtures, or ascorbic acid/hydrogen peroxide, or alternatively compounds that can be cleaved photochemically or by ionizing radiation, for example ultraviolet rays, or by beta or gamma radiation.

The term "chain-transfer agent" means a compound whose purpose is to ensure homogeneous growth of macromolecular chains via reversible transfer reactions between growing species, i.e. polymer chains terminated with a carbon-based radical, and dormant species, i.e. polymer chains terminated with a transfer agent. This reversible transfer process makes it possible to control the molecular masses of the copolymers thus prepared. Preferably, in the process of the invention, the chain-transfer agent comprises a thiocarbonylthio group —S—C(=S)—. As illustrations of chain-transfer agents, mention may be made of dithioesters, trithiocarbonates, xanthates and dithiocarbamates. A preferred transfer agent is cumyl dithiobenzoate or 2-cyano-2-propyl benzodithioate.

The term "chain-transfer agent" also means a compound whose purpose is to limit the growth of macromolecular chains undergoing formation by addition of monomer molecules and to initiate new chains, which makes it possible to limit the final molecular masses, or even to control them. Such a type of transfer agent is used in telomerization. A preferred transfer agent is cysteamine.

In one embodiment, the process for preparing a polydiol oligomer comprises:
- at least one polymerization step (a) as defined above, in which the monomers M1 and M2 are chosen with $X_1$ and $X_2$ representing hydrogen.

According to one embodiment (when a radical polymerization has been performed with a RAFT chain-transfer agent), after the direct synthesis of the oligomer containing the diol functions, the process comprises a step of removing the RAFT chain end by aminolysis followed by Michael addition.

The preferences and definitions described for the general formulae (1), (I-A), (I-B), (II-A), (II-B) and (X) also apply to the processes described above.

Properties of the Polydiol Oligomers A1

The polydiol oligomers A1 are linear. The oligomers A1 have a backbone of polymerizable functions, notably a backbone of methacrylate functions and optionally styrene or styrene-based functions, and a mixture of hydrocarbon-based side chains optionally substituted with diol functions.

The polydiol oligomers A1 have the advantage of being sensitive to external stimuli, such as temperature, pressure and shear rate; this sensitivity is reflected by a change in properties. In response to a stimulus, the spatial conformation of the oligomer chains is modified.

Advantageously, the side chains of the polydiol oligomer A1 have a mean length ranging from 8 to 20 carbon atoms, preferably from 9 to 18 carbon atoms. The term "mean length of the side chain" means the mean length of the side chains of the monomers M1 of formula (I) and M2 of formula (II) included in the constitution of the copolymer. The side chains derived from the optional styrene monomer(s) are not taken into account in the calculation of the mean lengths of the side chains. A person skilled in the art knows how to obtain this mean length by appropriately selecting the types and ratio of monomers constituting the polydiol oligomer. The choice of this mean chain length makes it possible to obtain an oligomer that is soluble in a hydrophobic medium, irrespective of the temperature at which the oligomer is dissolved. The polydiol oligomer A1 is thus miscible in a hydrophobic medium. The term "hydrophobic medium" means a medium that has little or no affinity for water, i.e. it is immiscible with water or with an aqueous medium.

Advantageously, the polydiol oligomer A1 has a molar percentage of repeating units corresponding to the monomer M1 of formula (I) in said copolymer ranging from 1% to less than 50%, preferably from 5% to 45%.

The molar percentage of monomers in the oligomer results directly from the adjustment of the amounts of monomers used for the synthesis of the oligomer.

Advantageously, the polydiol oligomer A1 has a number-average degree of polymerization ranging from 3 to 100, preferably from 3 to 50. In a known manner, the degree of polymerization is controlled using a controlled radical polymerization technique, a telomerization technique or by adjusting the amount of the source of free radicals when the copolymers of the invention are prepared by conventional radical polymerization.

Advantageously, the polydiol oligomer A1 has a polydispersity index (p) ranging from 1.05 to 4.0, preferably ranging from 1.10 to 3.8. The polydispersity index is obtained by size exclusion chromatography measurement using poly(methyl methacrylate) calibration.

Compound A2

Boronic Diester Compound A2

In one embodiment, compound A2 comprising two boronic ester functions has the general formula (III):

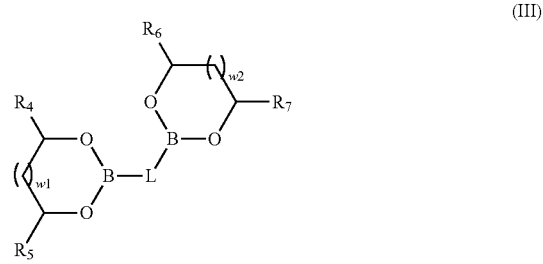

(III)

in which:
$w_1$ and $w_2$, which may be identical or different, are integers equal to 0 or 1, $R_4$, $R_5$, $R_6$ and Rr, which may be identical or different, are chosen from the group formed by hydrogen and a hydrocarbon-based group comprising from 1 to 30 carbon atoms, preferably between 4 and 18 carbon atoms and even more preferentially between 6 and 14 carbon atoms, said hydrocarbon-based group being optionally substituted with one or more groups chosen from a hydroxyl and a group —OJ or —C(O)—O-J with J being a hydrocarbon-based group comprising from 1 to 24 carbon atoms; preferably, J comprises from 4 to 18 carbon atoms, preferably between 6 and 12 carbon atoms;

L is a divalent bonding group chosen from the group formed by a $C_6$-$C_{18}$ aryl, a $C_7$-$C_{24}$ aralkyl and a $C_2$-$C_{24}$ hydrocarbon-based chain. Preferably, the hydrocarbon-based chain is a linear alkyl group. Preferably, the hydrocarbon-based chain comprises from 6 to 16 carbon atoms. Preferably, L is a $C_6$-$C_{18}$ aryl.

In one embodiment of the invention, compound A2 is a compound of general formula (III) above in which:
$w_1$ and $w_2$, which may be identical or different, are integers equal to 0 or 1;
$R_4$ and $R_6$ are identical and are hydrogen atoms;
$R_5$ and $R_7$ are identical and are a hydrocarbon-based group, preferably a linear alkyl, containing from 1 to 24 carbon atoms, preferably from 4 to 18 carbon atoms, preferably from 6 to 16 carbon atoms;
L is a divalent bonding group and is a $C_6$-$C_{18}$ aryl, preferably phenyl.

The boronic diester compound A2 of formula (III) as described above is obtained according to the process described in WO2015/110642 or in WO2015/110643.

Poly(Boronic Ester) Oligomer Compound A2

In another embodiment, compound A2 comprising at least two boronic ester functions is a poly(boronic ester) oligomer resulting from the copolymerization of at least two monomers M4 of formula (IV) as described below with
at least one monomer M5 of formula (V) as described below
and/or
at least one monomer M3 of formula (X) as defined above.

In the rest of the patent application, the expressions "boronic ester oligomer or copolymer" or "poly(boronic ester) oligomer or copolymer" are equivalent and denote the same copolymer.

Advantageously, the poly(boronic ester) copolymer has a number-average molar mass ranging from 400 g/mol to 10 000 g/mol.

Preferably, the boronic ester oligomer A2 has a number-average molar mass ranging from 600 g/mol to less than 10 000 g/mol, advantageously from 600 g/mol to 9500 g/mol, better still from 600 to 5000 g/mol.

The number-average molar mass is obtained by size exclusion chromatography measurement using poly(methyl methacrylate) calibration. The size exclusion chromatography measurement method using poly(methyl methacrylate) calibration is described in the publication (Fontanille, M.; Gnanou, Y., *Chimie et physico-chimie des polymères* [*Chemistry and physical chemistry of polymers*] 2nd ed.; Dunod: 2010; page 546).

Monomer M4 of Formula (IV)

The monomer M4 of the boronic ester oligomer compound A2 has the general formula (IV) in which:

(IV)

in which:
t is an integer equal to 0 or 1;
u is an integer equal to 0 or 1;
M and $R_8$ are identical or different divalent bonding groups and are chosen from the group formed by a $C_6$-$C_{18}$ aryl, a $C_1$-$C_{24}$ aralkyl and a $C_2$-$C_{24}$ alkyl, preferably a $C_6$-$C_{18}$ aryl,
X is a function chosen from the group formed by —O—C(O)—, —C(O)—O—, —C(O)—N(H)—, —N(H)—C(O)—, —S—, —N(H)—, —N(R'$_4$)— and —O— with R'$_4$ being a hydrocarbon-based chain comprising from 1 to 15 carbon atoms; preferably, the hydrocarbon-based chain R'$_4$ is a linear alkyl group; preferably, R'$_4$ comprises from 1 to 8 carbon atoms;
$R_9$ is chosen from the group formed by —H, —$CH_3$ and —$CH_2$—$CH_3$, preferably —H and —$CH_3$;
$R_{10}$ and $R_{11}$, which may be identical or different, are chosen from the group formed by hydrogen and a hydrocarbon-based group comprising from 1 to 30 carbon atoms, preferably between 4 and 18 carbon atoms and even more preferentially between 6 and 14 carbon atoms, said hydrocarbon-based group being optionally substituted with one or more groups chosen from a hydroxyl and a group —OJ or —C(O)—O-J with J being a hydrocarbon-based group comprising from 1 to 24 carbon atoms; preferably, the hydrocarbon-based chain J comprises from 4 to 18 carbon atoms, preferably between 6 and 12 carbon atoms.

In one embodiment, the monomer M4 has the general formula (IV) in which:
t is an integer equal to 0 or 1;
u is an integer equal to 0 or 1;
M and $R_8$ are divalent bonding groups and are different, M is a $C_6$-$C_{18}$ aryl, preferably phenyl, $R_8$ is a $C_1$-$C_{24}$ aralkyl, preferably benzyl;
X is a function chosen from the group formed by —O—C(O)—, —C(O)—O—, —C(O)—N(H)— and —O—, preferably —C(O)—O— or —O—C(O)—; $R_9$ is chosen from the group formed by —H and —$CH_3$, preferably —H;
$R_{10}$ and $R_{11}$ are different, one of the groups $R_{10}$ or $R_{11}$ is H and the other group $R_{10}$ or $R_{11}$ is a hydrocarbon-based chain, preferably a linear alkyl group containing from 1 to 24 carbon atoms, preferably between 4 and 18 carbon atoms, preferably between 6 and 12 carbon atoms.

In one embodiment, the monomer M4 is a styrene monomer. This is the case when, in formula (IV): u=1, R9 is H and $R_8$ represents a $C_6$-$C_{18}$ aryl or a $C_1$-$C_{24}$ aralkyl and the double bond of the monomer M4 of formula (IV) is directly connected to the aryl group.

Synthesis of the Monomer M4 of Formula (IV)

The monomer M4 of formula (IV) as described above is obtained according to the process described in WO2015/110642 or in WO2015/110643.

Monomer M5 of General Formula (V):

The monomer M5 of the boronic ester copolymer compound A2 has the general formula (V)

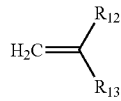
(V)

in which:
R$_{12}$ is chosen from the group formed by —H, —CH$_3$ and —CH$_2$—CH$_3$, preferably —H and —CH$_3$;
R$_{13}$ is chosen from the group formed by —C(O)—O—R'$_{13}$; —O—R'$_{13}$, —S—R'$_{13}$ and —C(O)—N(H)—R'$_{13}$, with R'$_{13}$ a C$_1$-C$_{25}$ alkyl group.
Preferably, R'$_{13}$ is linear.

Among the monomers of formula (V), the monomers corresponding to formula (V-A) are among the preferred:

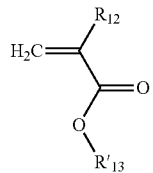
(V-A)

in which:
R$_2$ is chosen from the group formed by —H, —CH$_3$ and —CH$_2$—CH$_3$, preferably —H and —CH$_3$;
R'$_{13}$ is a C$_1$-C$_{25}$ alkyl group, preferably a linear C$_1$-C$_{25}$ alkyl, even more preferably a linear C$_5$-C$_{15}$ alkyl.

Production of the Monomer M5:

The monomers of formulae (V) and (V-A) are well known to those skilled in the art. They are sold by Sigma-Aldrich® and TCI®.

Synthesis of the Poly(Boronic Ester) Oligomer Compound A2

A person skilled in the art is capable of synthesizing the boronic ester oligomers or copolymers on the basis of his general knowledge. The copolymerization may be initiated in bulk or in solution in an organic solvent with free-radical-generating compounds. For example, the boronic ester oligomers or copolymers are obtained via the known processes of radical copolymerization, notably controlled radical copolymerization, such as the method known as reversible addition-fragmentation chain transfer (RAFT) controlled radical polymerization and the method known as atom-transfer radical polymerization (ATRP). Conventional radical polymerization and telomerization may also be employed to prepare the copolymers or oligomers of the invention (Moad, G.; Solomon, D. H., *The Chemistry of Radical Polymerization*. 2nd ed.; Elsevier Ltd: 2006; page 639; Matyaszewski, K.; Davis, T. P. *Handbook of Radical Polymerization*; Wiley-Interscience: Hoboken, 2002; page 936)).

The boronic ester copolymer or oligomer is prepared according to a process which comprises at least one polymerization step (a) in which at least the following are placed in contact:
i) two monomers M4 of general formula (IV) as defined previously;
ii) optionally at least one monomer M5 of general formula (V) as defined previously;
iii) optionally at least one monomer M3 of general formula (X) as described previously;
iv) at least one source of free radicals.

In one embodiment, the process may also comprise v) at least one chain-transfer agent.

The preferences and definitions described for the general formulae (IV), (V) and (X) also apply to the process.

The sources of radicals and the transfer agents are those that have been described for the synthesis of the polydiol oligomers. The preferences described for the sources of radicals and the transfer agents also apply to this process.

Properties of the Poly(Boronic Ester) Oligomer Compounds A2

Advantageously, the chain formed by the sequence of groups R$_{10}$, M, (R$_8$)$_u$ with u being an integer equal to 0 or 1, and X of the monomer M4 of general formula (IV) has a total number of carbon atoms ranging from 8 to 38, preferably ranging from 10 to 26.

Advantageously, the side chains of the boronic ester copolymer or oligomer have a mean length of greater than 8 carbon atoms, preferably ranging from 11 to 16. This chain length makes it possible to dissolve the boronic ester copolymer or oligomer in a hydrophobic medium. The term "mean length of the side chain" means the mean length of the side chains of each monomer constituting the copolymer or oligomer. The side chains derived from the styrene monomer(s) are not taken into account in the calculation of the mean lengths of the side chains. A person skilled in the art knows how to obtain this mean length by appropriately selecting the types and ratio of monomers constituting the boronic ester copolymer or oligomer.

Advantageously, the boronic ester oligomer A2 has a molar percentage of monomer M4 of formula (IV) in said copolymer or oligomer ranging from 4% to 50%, preferably from 4% to 30%.

Advantageously, the boronic ester oligomer A2 has a molar percentage of monomer M4 of formula (IV) in said copolymer or oligomer ranging from 4% to 50%, preferably from 4% to 30%, and a molar percentage of monomer M5 of formula (V) in said copolymer or oligomer ranging from 50% to 96%, preferably from 70% to 96%.

Advantageously, the boronic ester oligomer A2 has a molar percentage of monomer M3, of formula (X), in said oligomer ranging from 2 mol % to 50 mol %, preferentially from 3 mol % to 40 mol % and more preferably from 5 mol % to 35 mol %.

Advantageously, the boronic ester oligomer has a number-average degree of polymerization ranging from 2 to 100, preferably from 2 to 50.

Advantageously, the boronic ester oligomer has a polydispersity index (p) ranging from 1.04 to 3.54, preferably ranging from 1.10 to 3.10. These values are obtained by size exclusion chromatography using tetrahydrofuran as eluent and poly(methyl methacrylate) calibration.

Compound A2, notably the boronic ester oligomer, has the property of being able to react in a hydrophobic medium, notably an apolar medium, with a compound bearing diol function(s) via a transesterification reaction. This transesterification reaction may be represented according to scheme 1 below:

Scheme 1

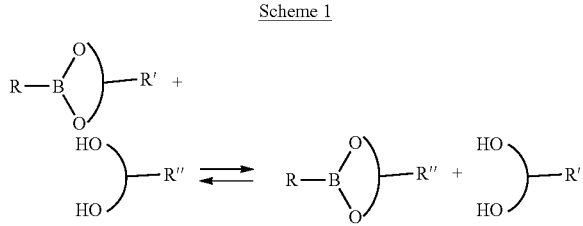

Thus, during a transesterification reaction, a boronic ester of different chemical structure from that of the starting boronic ester is formed by exchange of the hydrocarbon-based groups symbolized by

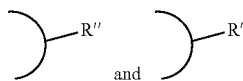

Exogenous compound A4

According to one embodiment, the additive composition results from the mixing of at least:
- a polydiol oligomer A1,
- a compound A2 comprising at least two boronic ester functions, which may be an oligomer, A2 comprising at least two boronic ester functions and being able to associate with said polydiol oligomer A1 via at least one transesterification reaction,
- an exogenous polyol compound A4.

Advantageously, according to this embodiment of the invention, the molar percentage of exogenous compound A4 in the additive composition, relative to the boronic ester functions of compound A2, ranges from 0.025% to 5000%, preferably from 0.1% to 1000%, even more preferably from 0.5% to 500%, even more preferably from 1% to 150%.

The exogenous compound A4 is chosen from polyols, notably 1,2-diols and 1,3-diols and also glycerol derivatives. For the purposes of the present invention, the term "exogenous compound" means a compound which is added to the additive composition resulting from the mixing of at least one polydiol oligomer A1 and of at least one compound A2, notably the poly(boronic ester) oligomer.

Compound A4 is chosen from organic compounds comprising at least one diol group and which are compatible with use in a lubricant composition. Preferably, compound A4 is chosen from hydrocarbon-based compounds containing from 2 to 30 carbon atoms.

Preferably, this exogenous compound A4 is chosen from lubricant additives, for instance compounds known for their function as friction modifier, thickener, dispersant or detergent in lubricant compositions.

The exogenous compound A4 may notably be chosen from 1,2-diols and 1,3-diols and also glycerol derivatives.

According to a preferred embodiment, the exogenous compound A4 may have the general formula (VI):

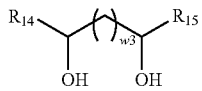

(VI)

in which:
w3 is an integer equal to 0 or 1,
$R_{14}$ and $R_{15}$, which may be identical or different, are chosen from the group formed by hydrogen and a hydrocarbon-based chain containing from 1 to 24 carbon atoms, preferably between 4 and 18 carbon atoms, preferably between 6 and 12 carbon atoms; preferably, the hydrocarbon-based chain is a linear alkyl group. Preferably, it comprises from 4 to 18 carbon atoms and preferably between 6 and 12 carbon atoms.

In one embodiment, the exogenous compound A4 has the general formula (VI) in which:
$w_3$ is an integer equal to 0 or 1;
$R_{14}$ and $R_{15}$, which may be identical or different, are chosen from groups formed by -T, —$CH_2$—O-T and —$CH_2$—O—C(O)-T, T being chosen from the group formed by hydrogen and a hydrocarbon-based chain, preferably a linear alkyl chain, containing from 1 to 24 carbon atoms, preferably between 4 and 18 carbon atoms, preferably between 6 and 12 carbon atoms.

In one embodiment, the exogenous compound A4 has the general formula (VI) in which:
$w_3$ is an integer equal to 0 or 1;
$R_{14}$ and $R_{15}$ are different, one of the groups $R_{14}$ or $R_{15}$ is H and the other group $R_{14}$ or $R_{15}$ is a hydrocarbon-based chain, preferably a linear alkyl group containing from 1 to 24 carbon atoms, preferably between 4 and 18 carbon atoms, preferably between 6 and 12 carbon atoms.

In another preferred embodiment, the exogenous compound is chosen from sugars and sugar derivatives.

A person skilled in the art is capable, on the basis of his general knowledge, of choosing, from among sugars and sugar derivatives, the ones that are compatible with a lubricant oil.

The compounds of formula (VI) are commercially available from the following suppliers: Sigma-Aldrich®, Alfa Aesar® and TCI®.

Exogenous Compound A5

According to one embodiment, the additive composition results from the mixing of at least:
- a polydiol oligomer A1,
- a compound A2 comprising at least two boronic ester functions, notably a copolymer, advantageously an oligomer, A2 comprising at least two boronic ester functions and being able to associate with said polydiol oligomer A1 via at least one transesterification reaction,
- an exogenous compound A5 chosen from those corresponding to formula (XI):

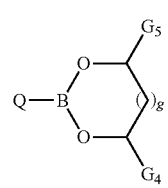

(XI)

in which:
Q represents a group chosen from a hydrocarbon-based group comprising from 1 to 30 carbon atoms, optionally substituted with one or more groups chosen from: a hydroxyl, a group —OJ or —C(O)—O-J with J being a hydrocarbon-based group comprising from 1 to 24 carbon atoms;

$G_4$ and $G_5$, which may be identical or different, represent groups chosen from a hydrogen atom, a hydrocarbon-based chain comprising from 1 to 24 carbon atoms, a hydroxyl, a group —OJ or —C(O)—O-J with J being a hydrocarbon-based group comprising from 1 to 24 carbon atoms;

g represents 0 or 1.

Advantageously, the exogenous compound A5 corresponds to formula (XIIA):

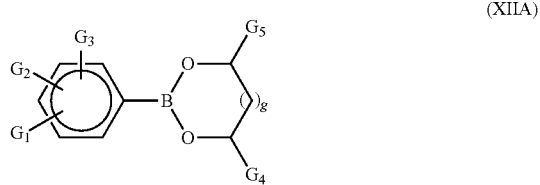

(XIIA)

in which:

$G_1$, $G_2$, $G_3$, $G_4$ and $G_5$, which may be identical or different, represent groups chosen from a hydrogen atom, a hydrocarbon-based chain comprising from 1 to 24 carbon atoms, a hydroxyl, a group —OJ or —C(O)—O-J with J being a hydrocarbon-based group comprising from 1 to 24 carbon atoms;

g represents 0 or 1.

According to a preferred embodiment, the molar percentage of exogenous compound A5 relative to the diol functions of the oligomer A1 ranges from 0.025% to 5000%, preferably from 0.1% to 1000%, even more preferably from 0.5% to 500%, even more preferably from 1% to 150%.

According to a preferred embodiment, the exogenous compound A5 is chosen from those corresponding to formula (XIIB):

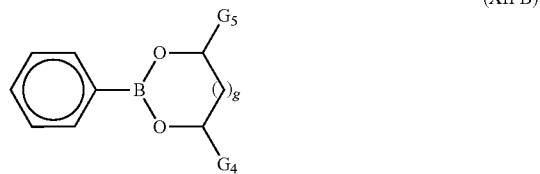

(XIIB)

According to a more preferred embodiment, the exogenous compound A5 is chosen from those corresponding to formula (XIIB) with g=0, $G_4$=H and $G_5$ represents a $C_1$-$C_{24}$ alkyl.

By transesterification reaction, the exogenous compound A5 releases in situ the diol fragment A6 of formula (XII):

(XIII)

Characteristics of the Novel Additive Compositions of the Invention

The additive compositions of the invention resulting from the mixing of at least one polydiol oligomer A1 as defined above, of at least one compound A2 as defined previously, and optionally of at least one exogenous compound A4 or A5 as defined above have rheological properties that are very varied as a function of the temperature and according to the proportion of the compounds A1, A2 and optionally A4 and A5 used.

The polydiol oligomers A1 and the compounds A2 as defined above have the advantage of being associative and of exchanging chemical bonds, notably in a hydrophobic medium, notably an apolar hydrophobic medium.

Under certain conditions, the polydiol oligomers A1 and the compounds A2 as defined above may be crosslinked.

The polydiol oligomers A1 and the compounds A2 also have the advantage of being exchangeable.

The term "associative" means that covalent chemical bonds of boronic ester type are established between the polydiol oligomers A1 and the compounds A2 comprising at least two boronic ester functions. Depending on the functionality of the polydiols A1 and of the compounds A2 and depending on the composition of the mixtures, the formation of covalent bonds between the polydiols A1 and the compounds A2 will optionally be able to lead to the formation of a three-dimensional polymer network.

The term "chemical bond" means a covalent chemical bond of boronic ester type.

The term "exchangeable" means that the compounds are capable of exchanging chemical bonds between themselves without the total number or nature of the chemical functions being modified. The chemical exchange reaction (transesterification) is illustrated in reaction scheme 2 below:

Scheme 2

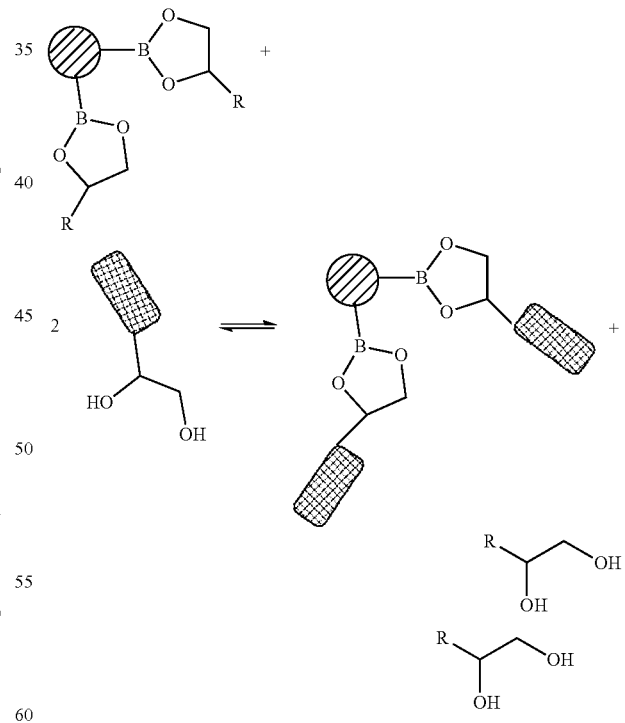

with:
R being a chemical group of the compound A2,
the hatched circle symbolizes the rest of the chemical structure of compound A2,
the cross-ruled rectangle symbolizes the rest of the chemical structure of the polydiol oligomer A1.

Figure 2:
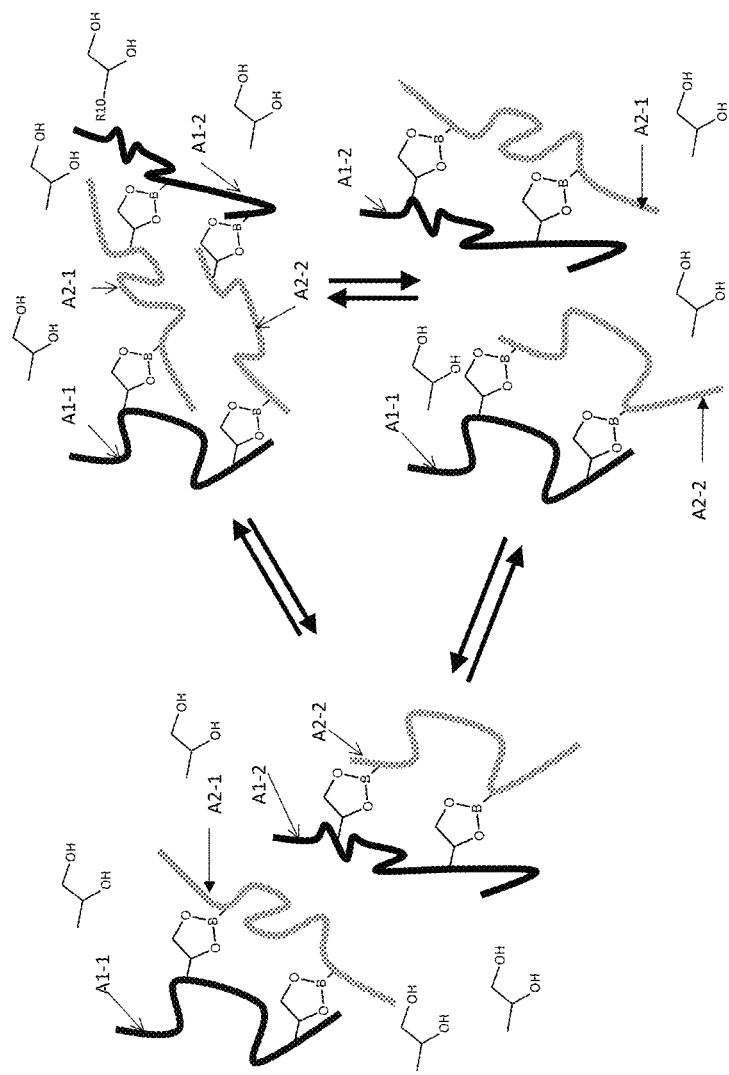

The boronic ester bonds of the compounds A2, optionally the boronic ester bonds formed by transesterification reaction between the boronic esters of the compounds A2 and the exogenous compounds A4, and also the boronic ester bonds formed by association of the polydiol oligomers A1 and of the compounds A2 can exchange with the diol functions borne by the compounds A3 released in situ and optionally with diol functions borne by the exogenous compounds A4 and/or A5 to form novel boronic esters and novel diol functions without the total number of boronic ester functions and of diol functions being affected. This other chemical bond exchange process takes place by metathesis reaction, via successive exchanges of the boronic ester functions in the presence of diols. Another chemical bond exchange process is illustrated in FIG. 2, in which it may be observed that the polydiol oligomer A1-1, which was associated with the oligomer A2-1, has exchanged two boronic ester bonds with the boronic ester oligomer A2-2. The polydiol oligomer A1-2, which was associated with the oligomer A2-2, has exchanged two boronic ester bonds with the boronic ester oligomer A2-1; the total number of boronic ester bonds in the composition remains unchanged and is equal to 4. The oligomer A1-1 is then associated with the oligomer A2-2. The oligomer A1-2 is then with the oligomer A2-1. The oligomer A2-1 has been exchanged with the polymer A2-2.

Figure 3:
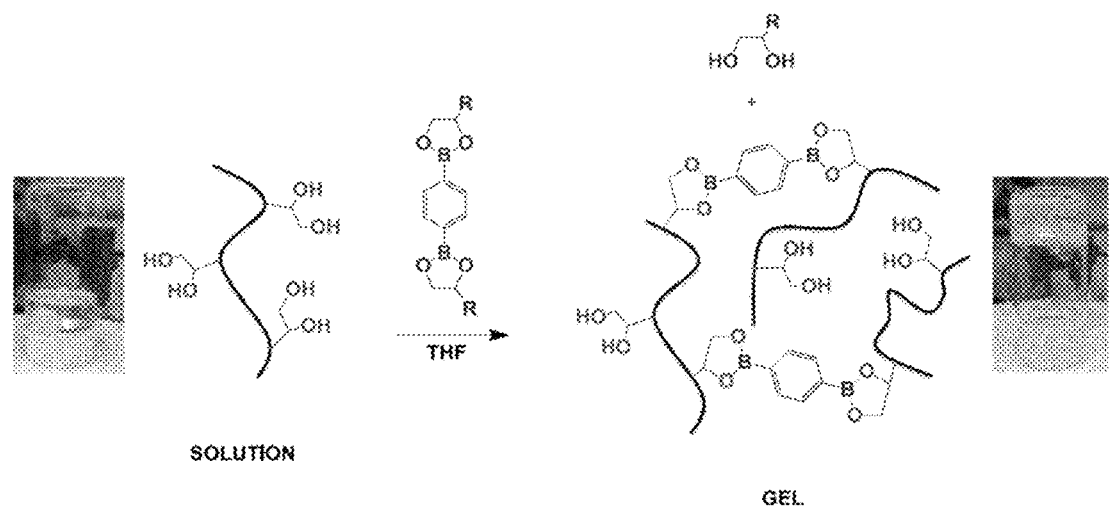

The term "crosslinked" refers to a copolymer or oligomer in the form of a network obtained by establishing bridges between the macromolecular chains of the copolymer or oligomer. These chains connected together are for the most part distributed in the three dimensions of space. A crosslinked copolymer or oligomer forms a three-dimensional network. In practice, the formation of a copolymer or oligomer network is confirmed by a solubility test. It may be confirmed that a copolymer network has been formed by placing the copolymer network in a solvent known to dissolve non-crosslinked copolymers of the same chemical nature. If the copolymer swells instead of being dissolved, a person skilled in the art knows that a network has been formed. FIG. 3 illustrates this solubility test.

The term "crosslinkable" refers to a copolymer or oligomer that is capable of being crosslinked.

The term "reversibly crosslinked" refers to a crosslinked copolymer or oligomer whose bridges are formed via a reversible chemical reaction. The reversible chemical reaction can move in one direction or in another, leading to a change of structure of the polymer network. The copolymer or oligomer may go from an initial non-crosslinked state to a crosslinked state (three-dimensional copolymer network) and from a crosslinked state to a non-crosslinked initial state. In the context of the present invention, the bridges that are formed between the copolymer or oligomer chains are labile. These bridges may be formed or exchanged by means of a chemical reaction that is reversible. In the context of the present invention, the reversible chemical reaction is a transesterification reaction between diol functions of an oligomer (copolymer A1) and boronic ester functions of a crosslinking agent (compound A2). The bridges formed are bonds of boronic ester type. These boronic ester bonds are covalent and labile due to the reversibility of the transesterification reaction.

The amount of boronic ester bonds (or boronic ester bond) that can be established between the polydiol oligomers A1 and the compounds A2 is adjusted by a person skilled in the art by means of an appropriate selection of the polydiol oligomer A1, of compound A2 and of the composition of the mixture.

In addition, a person skilled in the art knows how to select the structure of compound A2 as a function of the structure of the oligomer A1. Preferably, when in the oligomer A1 comprising at least one monomer M1 in which y=1, then compound A2 of general formula (III) or the copolymer or oligomer A2 comprising at least one monomer M4 of formula (IV) will preferably be chosen with $w_1=1$, $w_2=1$ and t=1, respectively.

By controlling the degree of association of the polydiol oligomer A1 and of compound A2, notably of the poly (boronic ester) oligomer, the viscosity and the rheological behavior of this composition are modified. When it is present, the exogenous compound A4 and/or A5 makes it possible to modulate the viscosity of this composition according to the desired use.

In a preferred embodiment of the invention, the exogenous compound A4 is of the same chemical nature as the diol compound A3 released in situ by transesterification reaction between the polydiol oligomer A1 and compound A2, notably the poly(boronic ester) oligomer. According to this embodiment, the total amount of free diols present in said composition is strictly greater than the amount of diol compounds released in situ. The term "free diols" means the diol functions that are able to form a chemical bond of boronic ester type by transesterification reaction. For the purposes of the present patent application, the term "total amount of free diols" means the total number of diol functions that can form a chemical bond of boronic ester type by transesterification.

According to this embodiment, the total amount of free diols is always equal to the sum of the number of moles of exogenous diol compounds A4 and of the number (expressed in mol) of diol functions of the polydiol oligomer A1. In other words, if, in the additive composition, there are:

i mol of exogenous diol compounds A4 and
j mol of polydiol oligomer A1, the total amount of free diol will be at any instant (thus irrespective of the degree of association between the polydiol oligomer A1 and compound A2, notably the poly (boronic ester) oligomer) A2)=i+j* the mean number of diols per A1 oligomer chain (unit: mol).

The amount of diols released in situ in the context of the transesterification reactions between A1 and A2 is equal to the number of boronic ester functions connecting the oligomers A1 and A2.

A person skilled in the art knows how to select the chemical structure and the amount of exogenous compounds A4 that he adds to the additive composition as a function of the molar percentage of boronic ester function of compound A2, notably as a function of the poly(boronic ester) oligomer, to modulate the rheological behavior of the composition.

Advantageously, the content of oligomer A1 in the composition ranges from 0.1% to 50.0% by weight relative to the total weight of the composition, preferably from 0.25% to 40% by weight relative to the total weight of the final composition, and more preferably from 1% to 40% by weight relative to the total weight of the final composition.

Advantageously, the content of compound A2 in the composition ranges from 0.1% to 50.0% by weight relative to the total weight of the composition, preferably from 0.25% to 40% by weight relative to the total weight of the final composition, and more preferably from 1% to 40% by weight relative to the total weight of the final composition.

In one embodiment, the content of oligomer A1 in the composition ranges from 0.1% to 50.0% by weight relative to the total weight of the composition and the content of compound A2, notably of boronic ester oligomer, in the composition ranges from 0.1% to 50.0% by weight relative to the total weight of the composition.

Preferentially, the mass ratio between the polydiol oligomer A1 and compound A2 (ratio A1/A2) in the composition ranges from 0.002 to 500, preferably from 0.05 to 20, even more preferably from 0.1 to 10.

In one embodiment, the composition of the invention is in the form of a stock composition. The term "stock composition" means a composition from which a person skilled in the art can make daughter solutions by taking a certain amount of stock solution made up by the addition of a necessary amount of diluent (solvent or the like) to obtain a desired concentration. A daughter composition is thus obtained by dilution of a stock composition.

A hydrophobic medium may be a solvent, a mineral oil, a natural oil or a synthetic oil.

In one embodiment, the composition of the invention may also comprise at least one additive chosen from the group formed by thermoplastics, elastomers, thermoplastic elastomers, thermosetting polymers, pigments, dyes, fillers, plasticizers, fibers, antioxidants, lubricant additives, compatibilizers, antifoams, dispersant additives, adhesion promoters and stabilizers.

Process for Preparing the Novel Additive Compositions of the Invention

The novel additive compositions of the invention are prepared by means that are well known to those skilled in the art. For example, it notably suffices for a person skilled in the art:
- to take a desired amount of a solution comprising the polydiol oligomer A1 as defined above;
- to take a desired amount of a solution comprising compound A2 as defined above; notably a desired amount of a solution comprising the poly(boronic ester) oligomer as defined previously; and
- optionally to take a desired amount of a solution comprising the exogenous compound A4 and/or A5 as defined above;
- to mix the solutions taken, either simultaneously or sequentially, to obtain the composition of the invention.

The order of addition of the compounds has no influence in the implementation of the process for preparing the additive composition.

Use of the Novel Compositions of the Invention

The compositions of the invention may be used in any medium whose viscosity varies as a function of the temperature. The compositions of the invention make it possible to thicken a fluid and to modulate the viscosity as a function of the temperature of use. The additive composition according to the invention may be used in fields as varied as enhanced oil recovery, the paper industry, paints, food additives, and cosmetic or pharmaceutical formulation.

They are more particularly advantageous for use as lubricant additive in an engine.

Lubricant Composition According to the Invention

Another subject of the present invention relates to a lubricant composition resulting from the mixing of at least:
- a lubricant oil,
- a polydiol oligomer A1 as defined previously,
- a compound A2, as defined previously, comprising at least two boronic ester functions and which can associate with said polydiol oligomer A1 via at least one transesterification reaction,
- optionally an exogenous compound A4 and/or A5 as defined previously.

The preferences and definitions described for the general formulae (I), (I-A), (I-B), (II-A), (II-B) and (X) also apply to the polydiol oligomer A1 used in the lubricant compositions of the invention.

The preferences and definitions described for the general formulae (II), (IV), (V) and (X) also apply to the boronic ester compound A2 used in the lubricant compositions of the invention.

The lubricant compositions according to the invention have the advantage of having a viscosity that is more stable with respect to a temperature change relative to the behavior of the base oil. Advantageously, the viscosity of the lubricant composition is thus controlled and is less dependent on temperature fluctuations. In addition, for a given temperature of use, it is possible to modulate the viscosity of the lubricant composition and its rheological behavior by modifying the amount of diol compounds or boronic esters added to the lubricant composition. Finally, the lubricant compositions of the invention have improved thermal stability, improved stability to oxidation, an improved viscosity index, improved resistance to cycling and better reproducibility of the performance qualities over time. They more particularly have better resistance to mechanical degradation.

Lubricant Oil

The term "oil" means a fatty substance that is liquid at room temperature (25° C.) and atmospheric pressure (760 mmHg i.e. $10^5$ Pa).

The term "lubricant oil" means an oil which attenuates the friction between two moving parts in order to facilitate the functioning of these parts. The lubricant oils may be of natural, mineral or synthetic origin.

The lubricant oils of natural origin may be oils of plant or animal origin, preferably oils of plant origin such as rapeseed oil, sunflower oil, palm oil, coconut kernel oil, etc.

The lubricant oils of mineral origin are of petroleum origin and are extracted from petroleum fractions originating from the atmospheric and vacuum distillation of crude oil. The distillation may be followed by refining operations such as solvent extraction, deasphalting, deparaffinning with solvent, hydrotreatment, hydrocracking, hydroisomerization, hydrofinishing, etc. By way of illustration, mention may be made of paraffinic mineral base oils such as the oil Bright Stock Solvent (BSS), naphthenic mineral base oils, aromatic mineral oils, hydrorefined mineral bases whose viscosity index is about 100, hydrocracked mineral bases whose viscosity index is between 120 and 130, or hydroisomerized mineral bases whose viscosity index is between 140 and 150.

The lubricant oils of synthetic origin (or synthetic bases) originate, as their name indicates, from chemical synthesis, such as the addition of a product to itself or polymerization, or the addition of one product to another product such as esterification, alkylation, fluorination, etc., of components originating from petrochemistry, carbon chemistry and mineral chemistry such as: olefins, aromatics, alcohols, acids, halogen-based, phosphorus-based, silicon-based compounds, etc. By way of illustration, mention may be made of:
- synthetic oils based on synthetic hydrocarbons such as poly-alpha-olefins (PAO), internal polyolefins (IPO), polybutenes and polyisobutenes (PIB), alkylbenzenes and alkylated polyphenyls;
- synthetic oils based on esters such as diacid esters or neopolyol esters;

synthetic oils based on polyglycols, such as monoalkylene glycols, polyalkylene glycols and polyalkylene glycol monoethers;

synthetic oils based on phosphate esters;

synthetic oils based on silicon derivatives such as silicone oils or polysiloxanes.

The lubricant oils that may be used in the composition of the invention may be chosen from any oil from groups I to V specified in the API guidelines (Base Oil Interchangeability Guidelines of the American Petroleum Institute (API)) (or equivalents thereof according to the ATIEL classification (Association Technique de l'Industrie Europeenne des Lubrifiants) as summarized below:

|  | Content of saturated compounds* | Sulfur content** | Viscosity index (VI)*** |
|---|---|---|---|
| Group I Mineral oils | <90% | >0.03% | 80 ≤ VI < 120 |
| Group II Hydrocracked oils | ≥90% | ≤0.03% | 80 ≤ VI < 120 |
| Group III Hydrocracked or hydroisomerized oils | ≥90% | ≤0.03% | ≥120 |
| Group IV | (PAO) poly-alpha-olefins | | |
| Group V | Esters and other bases not included in the bases of groups I to IV | | |

*measured according to the standard ASTM D2007
**measured according to the standards ASTM D2622, ASTM D4294, ASTM D4927 and ASTM D3120
***measured according to the standard ASTM D2270

The compositions of the invention may comprise one or more lubricant oils. The lubricant oil or the lubricant oil mixture is the predominant ingredient in the lubricant composition. It is then referred to as the lubricant base oil. The term "predominant ingredient" means that the lubricant oil or the lubricant oil mixture represents at least 51% by weight relative to the total weight of the composition.

Preferably, the lubricant oil or the lubricant oil mixture represents at least 70% by weight relative to the total weight of the composition.

In one embodiment of the invention, the lubricant oil is chosen from the group formed by the oils of group I, of group II, of group III, of group IV and of group V of the API classification, and a mixture thereof. Preferably, the lubricant oil is chosen from the group formed by the oils of group III, of group IV and of group V of the API classification, and a mixture thereof. Preferably, the lubricant oil is an oil from group III of the API classification.

The lubricant oil has a kinematic viscosity at 100° C. measured according to the standard ASTM D445 ranging from 2 to 150 cSt, preferably ranging from 2 to 15 cSt.

Functional Additives

In one embodiment, the composition of the invention may also comprise one or more functional additives chosen from the group formed by detergents, anti-wear additives, extreme-pressure additives, antioxidants, viscosity-index-enhancing polymers, pour-point improvers, antifoams, thickeners, anticorrosion additives, dispersants, friction modifiers, and mixtures thereof.

The functional additive(s) which are added to the composition of the invention are chosen as a function of the final use of the lubricant composition. These additives may be introduced in two different ways:

either each additive is added individually and sequentially to the composition, or all of the additives are added simultaneously to the composition; the additives are, in this case, generally available in the form of a pack, known as an additive pack.

The functional additive or the mixture of functional additives, when they are present, represent from 0.1% to 10% by weight relative to the total weight of the composition.

Detergents:

These additives reduce the formation of deposits on the surface of metal parts by dissolving the oxidation and combustion byproducts. The detergents that may be used in the lubricant compositions according to the present invention are well known to those skilled in the art. The detergents commonly used in the formulation of lubricant compositions are typically anionic compounds including a long lipophilic hydrocarbon-based chain and a hydrophilic head. The associated cation is typically a metal cation of an alkali metal or an alkaline-earth metal. The detergents are preferentially chosen from the alkali metal or alkaline-earth metal salts of carboxylic acids, sulfonates, salicylates and naphthenates, and also phenate salts. The alkali metals and alkaline-earth metals are preferentially calcium, magnesium, sodium or barium. These metal salts may contain the metal in an approximately stoichiometric amount or in excess (in an amount greater than the stoichiometric amount). In the latter case, these detergents are known as overbased detergents. The excess metal giving the overbased nature to the detergent is in the form of oil-insoluble metal salts, for example carbonate, hydroxide, oxalate, acetate or glutamate, preferentially carbonate.

Anti-Wear Additives and Extreme-Pressure Additives:

These additives protect the friction surfaces by forming a protective film adsorbed onto these surfaces. A wide variety of anti-wear and extreme-pressure additives exists. Illustrations that may be mentioned include phosphosulfur additives such as metal alkylthiophosphates, in particular zinc alkylthiophosphates and more specifically zinc dialkyldithiophosphates or ZnDTP, amine phosphates, polysulfides, notably sulfur-based olefins and metal dithiocarbamates.

Antioxidants:

These additives retard the degradation of the composition. Degradation of the composition may be reflected by the formation of deposits, the presence of sludges, or an increase in the viscosity of the composition. Antioxidants act as radical inhibitors or hydroperoxide destroyers. Among the antioxidants commonly employed are antioxidants of phenolic or amine type.

Anticorrosion Agents:

These additives cover the surface with a film which prevents the access of oxygen to the surface of the metal. They may occasionally neutralize acids or certain chemical products to prevent corrosion of the metal. By way of illustration, examples that may be mentioned include dimercaptothiadiazole (DMTD), benzotriazoles and phosphites (free sulfur scavenging).

Viscosity-Index-Enhancing Polymers:

These additives ensure good cold resistance and a minimum viscosity at high temperature for the composition. By way of illustration, examples that may be mentioned include polymer esters, olefin copolymers (OCP) or polymethacrylates (PMA).

Pour-Point Improvers:

These additives improve the cold behavior of compositions, by slowing the formation of paraffin crystals. They are, for example, polyalkyl methacrylates, polyacrylates, polyacrylamides, polyalkylphenols, polyalkylnaphthalenes and polyalkylstyrenes.

Antifoams:

These additives have the effect of countering the effect of the detergents. Illustrations that may be mentioned include polymethylsiloxanes and polyacrylates.

Thickeners:

Thickeners are additives used above all for industrial lubrication and make it possible to formulate lubricants of higher viscosity than engine lubricant compositions. Illustrations that may be mentioned include polyisobutenes with a weight-average molar mass of from 10 000 to 100 000 g/mol.

Dispersants:

These additives ensure the holding in suspension and the removal of insoluble solid contaminants constituted by the oxidation byproducts that are formed during the use of the composition. By way of illustration, examples that may be mentioned include succinimides, PIB (polyisobutene) succinimides and Mannich bases.

Friction Modifiers:

These additives improve the coefficient of friction of the composition. By way of illustration, mention may be made of molybdenum dithiocarbamate, and amines containing at least one hydrocarbon-based chain of at least 16 carbon atoms.

Contents of Compounds in the Lubricant Compositions

Advantageously, the content of oligomer A1 in the lubricant composition ranges from 0.25% to 40% by weight relative to the total weight of the lubricant composition, and preferably from 1% to 40% by weight relative to the total weight of the lubricant composition.

Advantageously, the content of compound A2 ranges from 0.25% to 40% by weight relative to the total weight of the lubricant composition, and preferably from 1% to 40% by weight relative to the total weight of the lubricant composition.

Preferentially, the mass ratio between the polydiol oligomer A1 and compound A2 (ratio A1/A2) ranges from 0.002 to 500, preferably from 0.05 to 20 and even more preferably from 0.1 to 10.

In one embodiment, the sum of the masses of the oligomer A1 and of compound A2 ranges from 0.2% to 50%, advantageously from 0.5% to 40% relative to the total mass of the lubricant composition, preferably from 2% to 40% relative to the total mass of the lubricant composition, and the mass of lubricant oil ranges from 50% to 99.8% relative to the total mass of the lubricant composition.

For engine applications, advantageously, the sum of the masses of the oligomer A1 and of compound A2 represents from 1% to 35% relative to the total mass of the lubricant composition.

For transmission applications, advantageously, the sum of the masses of the oligomer A1 and of compound A2 represents from 1% to 40%, relative to the total mass of the lubricant composition.

In one embodiment, the molar percentage of exogenous compound A4 in the lubricant composition ranges from 0.025% to 5000%, preferably from 0.1% to 1000%, more preferably from 0.5% to 500% and even more preferably from 1% to 150% relative to the boronic ester functions of compound A2, notably of the poly(boronic ester) oligomer.

In another embodiment, the molar percentage of exogenous compound A5 in the lubricant composition ranges from 0.025% to 5000%, preferably from 0.1% to 1000%, more preferably from 0.5% to 500% and even more preferably from 1% to 150% relative to the diol functions of compound A1, notably of the polydiol oligomer.

In one embodiment, the lubricant composition of the invention results from the mixing of:
  0.25% to 40% by weight of at least one polydiol oligomer A1 as defined previously, relative to the total weight of the lubricant composition;
  0.25% to 40% by weight of at least one compound A2 as defined previously, relative to the total weight of the lubricant composition; and
  optionally 0.1% to 10% by weight of at least one exogenous compound A4 as defined previously, relative to the total weight of the lubricant composition,
  optionally 0.1% to 10% by weight of at least one exogenous compound A5 as defined previously, relative to the total weight of the lubricant composition, and
  20% to 99.5% by weight of at least one lubricant oil as defined previously, relative to the total weight of the lubricant composition.

In another embodiment, the lubricant composition of the invention results from the mixing of:
  0.25% to 40% by weight of at least one polydiol oligomer A1 as defined previously, relative to the total weight of the lubricant composition;
  0.25% to 40% by weight of at least one compound A2 as defined previously, relative to the total weight of the lubricant composition; and
  optionally 0.1% to 10% by weight of at least one exogenous compound A4 as defined previously, relative to the total weight of the lubricant composition, and
  optionally 0.1% to 10% by weight of at least one exogenous compound A5 as defined previously, relative to the total weight of the lubricant composition,
  0.5% to 15% by weight of at least one functional additive as defined previously, relative to the total weight of the lubricant composition, and
  5% to 99% by weight of at least one lubricant oil as defined previously, relative to the total weight of the lubricant composition.

Another subject of the present invention is a composition for lubricating at least an engine, said composition comprising, and notably consists essentially of, a composition resulting from the mixing of:
  70% to 99% by weight, advantageously from 70% to 97% by weight, of a lubricant oil, and
  1% to 30% by weight, advantageously from 3% to 30% by weight, of a mixture of at least one oligomer A1 as defined previously and of at least one boronic ester compound A2 as defined previously; and
  optionally 0.1% to 10% by weight of at least one exogenous compound A4 as defined previously;
  optionally 0.1% to 10% by weight of at least one exogenous compound A5 as defined previously;
  the composition having a kinematic viscosity at 100° C. measured according to the standard ASTM D445 ranging from 3.8 to 26.1 cSt; the weight percentages being expressed relative to the total weight of said composition.

In a composition for lubricating at least an engine as defined above, the oligomers A1 and the compounds A2 as defined previously can reversibly associate and exchange, notably in the presence of the exogenous compound A4 and/or A5; however, they do not form three-dimensional networks. They are not crosslinked.

In one embodiment, the composition for lubricating at least an engine also comprises at least one functional additive chosen from the group formed by detergents, anti-wear additives, extreme-pressure additives, additional antioxidants, anticorrosion additives, viscosity-index-enhancing polymers, pour-point improvers, antifoams, thickeners, dispersants, friction modifiers, and mixtures thereof.

In one embodiment of the invention, the composition for lubricating at least an engine, said composition comprising, and notably consists essentially of, a composition resulting from the mixing of:

- 55% to 98.5% by weight of a lubricant oil, and
- 1% to 30% by weight of a mixture of at least one oligomer A1 as defined previously and of at least one compound A2 as defined previously; and
- optionally 0.1% to 10% by weight of at least one exogenous compound A4 as defined previously;
- optionally 0.1% to 10% by weight of at least one exogenous compound A5 as defined previously;
- 0.5% to 15% by weight of at least one functional additive chosen from the group formed by detergents, anti-wear additives, extreme-pressure additives, additional antioxidants, anticorrosion additives, viscosity-index-enhancing polymers, pour-point improvers, antifoams, thickeners, dispersants, friction modifiers, and mixtures thereof; the composition having a kinematic viscosity at 100° C. measured according to the standard ASTM D445 ranging from 3.8 to 26.1 cSt; the weight percentages being expressed relative to the total weight of said composition.

The definitions and preferences relating to the lubricant oils, to the oligomers A1, to the boronic ester compounds A2 and to the exogenous compounds A4 and A5 also apply to the compositions for lubricating at least an engine.

Another subject of the present invention is a composition for lubricating at least a transmission, such as manual or automatic gearboxes.

Thus, another subject of the present invention is a composition for lubricating at least a transmission, said composition comprising, and notably consists essentially of, a composition resulting from the mixing of:

- 50% to 95% by weight of a lubricant oil, and
- 5% to 40% by weight of a mixture of at least one oligomer A1 as defined previously and of at least one boronic ester compound A2 as defined previously; and
- optionally 0.1% to 10% by weight of at least one exogenous compound A4 as defined previously;
- optionally 0.1% to 10% by weight of at least one exogenous compound A5 as defined previously;

the composition having a kinematic viscosity at 100° C. measured according to the standard ASTM D445 ranging from 4.1 to 41 cSt, the weight percentages being expressed relative to the total weight of said composition.

In a composition for lubricating at least a transmission as defined above, the oligomers A1 and the boronic ester compounds A2 as defined previously can reversibly associate and exchange, notably in the presence of the exogenous compound A4 and/or A5; however, they do not form three-dimensional networks. They are not crosslinked.

In one embodiment, the composition for lubricating at least a transmission also comprises at least one functional additive chosen from the group formed by detergents, anti-wear additives, extreme-pressure additives, additional antioxidants, anticorrosion additives, viscosity-index-enhancing polymers, pour-point improvers, antifoams, thickeners, dispersants, friction modifiers, and mixtures thereof.

In one embodiment of the invention, the composition for lubricating at least a transmission comprises, and notably consists essentially of, a composition resulting from the mixing of:

- 50% to 94.9% by weight of a lubricant oil, and
- 5% to 35% by weight of a mixture of at least one oligomer A1 as defined previously and of at least one boronic ester compound A2 as defined previously; and
- optionally 0.1% to 10% by weight of at least one exogenous compound A4 as defined previously;
- optionally 0.1% to 10% by weight of at least one exogenous compound A5 as defined previously;
- 0.1% to 15% by weight of at least one functional additive chosen from the group formed by detergents, anti-wear additives, extreme-pressure additives, additional antioxidants, anticorrosion additives, viscosity-index-enhancing polymers, pour-point improvers, antifoams, thickeners, dispersants, friction modifiers, and mixtures thereof; the composition having a kinematic viscosity at 100° C. measured according to the standard ASTM D445 ranging from 4.1 to 41 cSt, the weight percentages being expressed relative to the total weight of said composition.

The definitions and preferences relating to the lubricant oils, to the oligomers A1, to the boronic ester compounds A2 and to the exogenous compounds A4 and/or A5 also apply to the compositions for lubricating at least a transmission.

Process for Preparing the Lubricant Compositions of the Invention

The lubricant compositions of the invention are prepared by means that are well known to those skilled in the art. For example, it notably suffices for a person skilled in the art:

- to take a desired amount of a solution comprising the polydiol oligomer A1 as defined above;
- to take a desired amount of a solution comprising the boronic ester compound A2 as defined previously;
- optionally to take a desired amount of a solution comprising the exogenous compound A4 and/or A5 as defined above;
- to mix, either simultaneously or sequentially, the solutions taken in a lubricant base oil, to obtain the lubricant composition of the invention.

The order of addition of the compounds has no influence in the implementation of the process for preparing the lubricant composition.

Properties of the Lubricant Compositions According to the Invention

The lubricant compositions of the invention result from the mixing of associative polymers which have the property of increasing the viscosity of the lubricant oil via associations. The lubricant compositions according to the invention have the advantage in that these associations or crosslinking are reversible and optionally in that the degree of association or of crosslinking may be controlled by means of the addition of an additional diol compound. In addition, they have improved thermal stability, an improved viscosity index, improved stability to oxidation, better cycling performance, and better reproducibility of the performance qualities over time, and also better resistance to mechanical degradation.

A person skilled in the art knows how to adjust the various parameters of the various constituents of the composition to obtain a lubricant composition whose viscosity is suitable for use.

The amount of boronic ester bonds (or boronic ester bond) that can be established between the polydiol oligomers A1 and the compounds A2 is adjusted by a person skilled in the art by means of an appropriate selection of the polydiol oligomer A1, of compound A2, optionally of the exogenous compound A4 and/or A5 and notably of the molar percentage of exogenous compound A4 and/or A5.

In addition, a person skilled in the art knows how to select the structure of compound A2 as a function of the structure of the oligomer A1. Preferably, when in the oligomer A1 comprising at least one monomer M1 in which y=1, then compound A2 of general formula (III) or the oligomer A2 comprising at least one monomer M4 of formula (IV) will preferably be chosen with $w_1=1$, $w_2=1$ and $t=1$, respectively.

Moreover, a person skilled in the art notably knows how to adjust:

the molar percentage of monomer M1 bearing diol functions in the polydiol oligomer A1, the molar percentage of monomer M3 of formula (X) in the polydiol oligomer A1, in particular the molar percentage of styrene, the molar percentage of monomer M4 bearing boronic ester functions in the boronic ester oligomer A2, the mean length of the side chains of the polydiol oligomer A1, the mean length of the side chains of the boronic ester oligomer A2, the length of the monomer M4 of the boronic ester oligomer A2, the mean degree of polymerization of the polydiol oligomer A1 and of the boronic ester oligomer A2, the mass percentage of the polydiol oligomer A1, the mass percentage of the boronic ester compound A2, optionally the amount of exogenous compound A4 and/or A5,

. . . .

Process for Modulating the Viscosity of a Lubricant Composition

Another subject of the present invention is a process for modulating the viscosity of a lubricant composition, the process comprising at least:

the provision of a lubricant composition resulting from the mixing of at least one lubricant oil, of at least one polydiol oligomer A1 and of at least one compound A2 comprising at least two boronic ester functions and which can associate with said polydiol oligomer A1 via at least one transesterification reaction, optionally the addition to said lubricant composition of at least one exogenous compound A4 and/or A5.

For the purposes of the present invention, the term "modulating the viscosity of a lubricant composition" means adapting the viscosity as a function of the use of the lubricant composition. Such a process is described in detail in WO 2016/113229.

Other Subjects According to the Invention

Another subject of the present invention is the use of the lubricant composition as defined above for lubricating a mechanical part.

In the rest of the description, the percentages are expressed on a weight basis relative to the total weight of the lubricant composition.

The compositions of the invention may be used for lubricating the surfaces of parts that are conventionally found in an engine, such as the piston system, rings and jackets.

The compositions of the invention may be used for the engines or transmissions of light vehicles or heavy-duty vehicles, but also ships.

Another subject of the present invention is a process for lubricating at least one mechanical part, notably at least an engine or at least a transmission, said process comprising a step in which said mechanical part is placed in contact with at least one lubricant composition as defined above.

The definitions and preferences relating to the lubricant oils, to the oligomers A1, to the boronic ester compounds A2 and, where appropriate, to the exogenous compounds A4 and/or A5 also apply to the process for lubricating at least one mechanical part.

FIGURES

FIG. 1 schematically represents a random copolymer (P1), a gradient copolymer (P2) and a block copolymer (P3); each circle represents a monomer unit. The difference in chemical structure between the monomers is symbolized by a different color (light gray/black).

FIG. 2 schematically illustrates the exchange reactions of boronic ester bonds between two polydiol oligomers (A1-1 and A1-2) and two boronic diester oligomers (A2-1 and a 2-2) in the presence of diols.

FIG. 3 schematically illustrates and represents the cross-linking of the composition according to the invention in tetrahydrofuran (THF).

Figure 4:
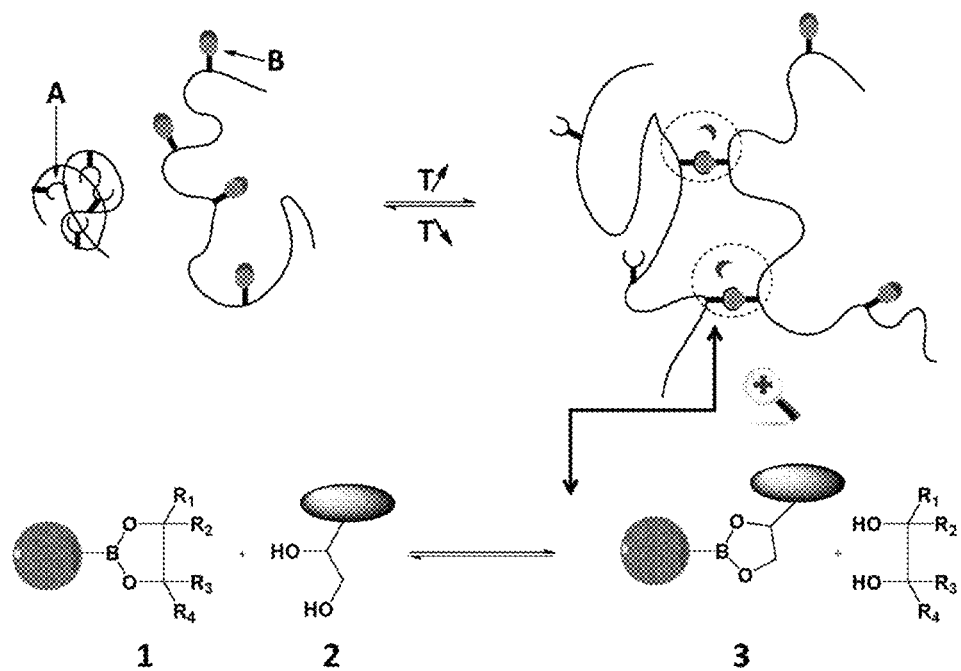

FIG. 4 schematically represents the behavior of the composition of the invention as a function of an external stimulus, in this example the temperature. An oligomer (2) bearing diol functions (function A) can reversibly associate with an oligomer (1) bearing boronic ester functions (function B) via a transesterification reaction. The organic group of the boronic ester functions (function B) which exchanges during the transesterification reaction is a diol symbolized by a black crescent. It forms a chemical bond (3) of boronic ester type with release of a diol compound.

Figure 5:
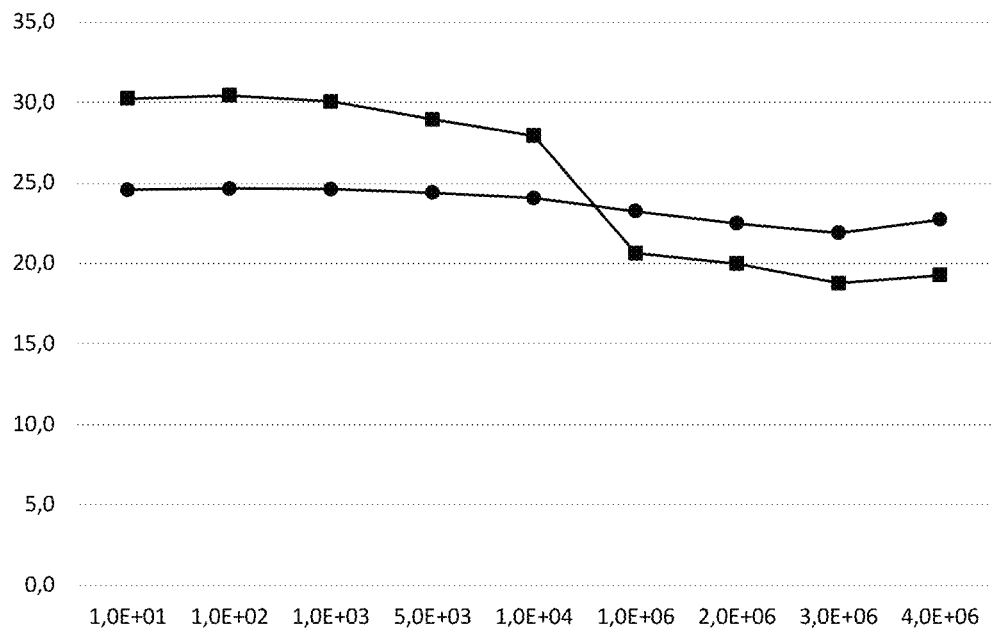

FIG. 5 is a graph showing the curves of variation in dynamic viscosity measured as a function of the shear rate applied to compositions A, B and F at 40° C. The (●) curve corresponds to composition A. The (■) curve corresponds to composition F. The x-axis of the graph represents the shear rate values in $s^{-1}$, and the y-axis represents the viscosity values measured in mPa·s.

Figure 6:
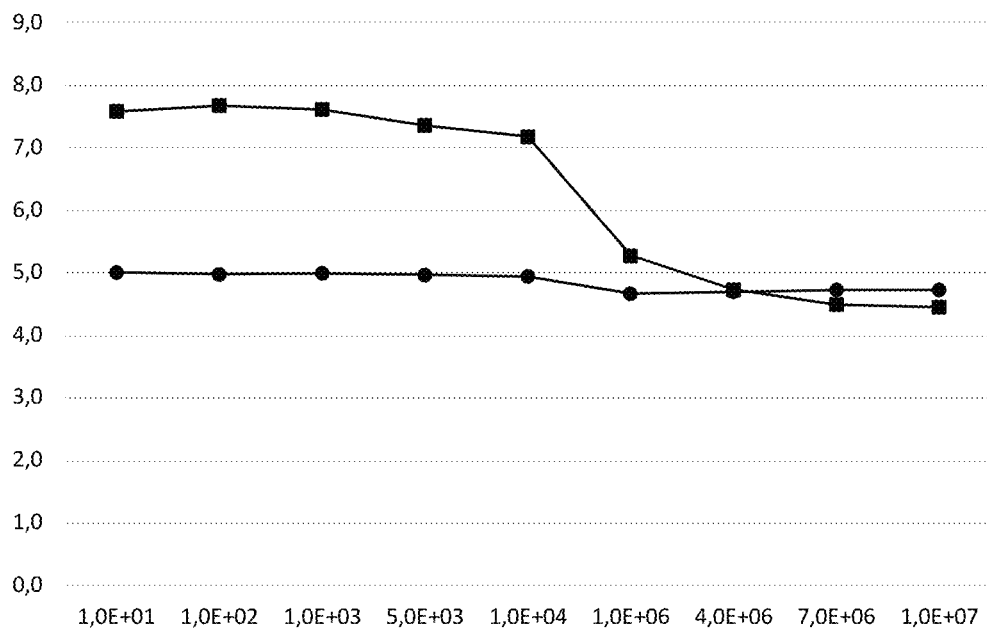

FIG. 6 is a graph showing the curves of variation in dynamic viscosity measured as a function of the shear rate applied to compositions A, B and F at 100° C. The (●) curve corresponds to composition A. The (■) curve corresponds to composition F. The x-axis of the graph represents the shear rate values in $s^{-1}$, and the y-axis represents the viscosity values measured in mPa·s.

Figure 7:
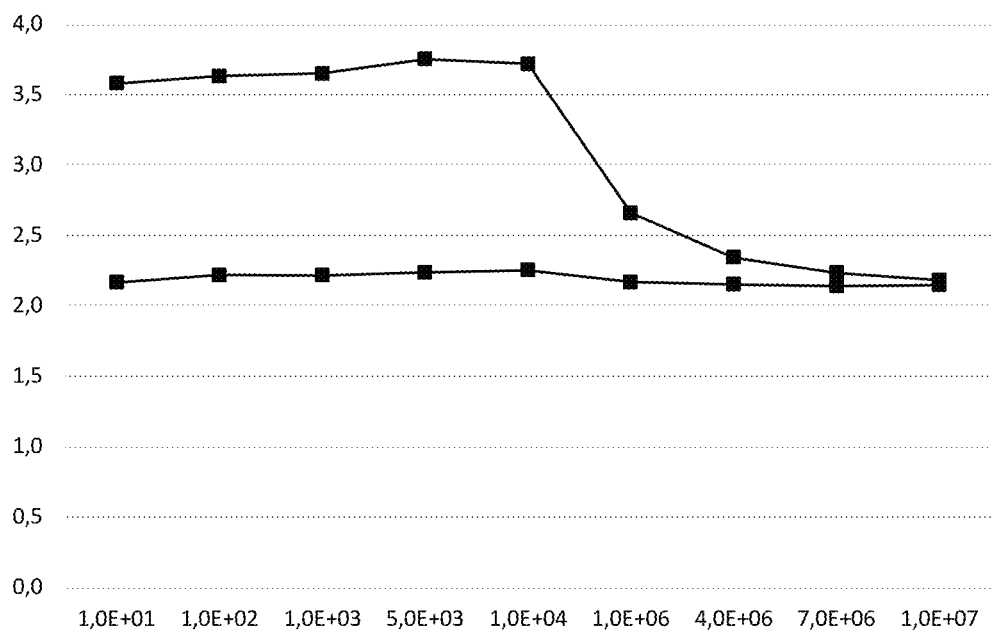

FIG. 7 is a graph showing the curves of variation in dynamic viscosity measured as a function of the shear rate applied to compositions A, B and F at 150° C. The (●) curve corresponds to composition A. The (■) curve corresponds to composition F. The x-axis of the graph represents the shear rate values in $s^{-1}$, and the y-axis represents the viscosity values measured in mPa·s.

EXPERIMENTAL SECTION

The examples that follow illustrate the invention without limiting it.

1. Syntheses 1.1. Synthesis of the Polydiol Oligomer 1.1.1. Monomers

Monomer M1: Methacrylate Bearing a Diol Function (Mono-Diol):

This synthesis is performed according to the protocol described in patent application WO 2018/096253 (experimental section § 1.1.1.).

Monomer M2: Stearyl Methacrylate (StMA):

The stearyl methacrylate is sold by Sigma-Aldrich® and TCI®.

Monomer M3: Styrene:
The styrene is sold by Sigma-Aldrich®.

1.1.2. Synthesis of the Oligomer o-Diol-4

The synthesis of the oligomer o-Diol-4 is performed according to the following reaction scheme:

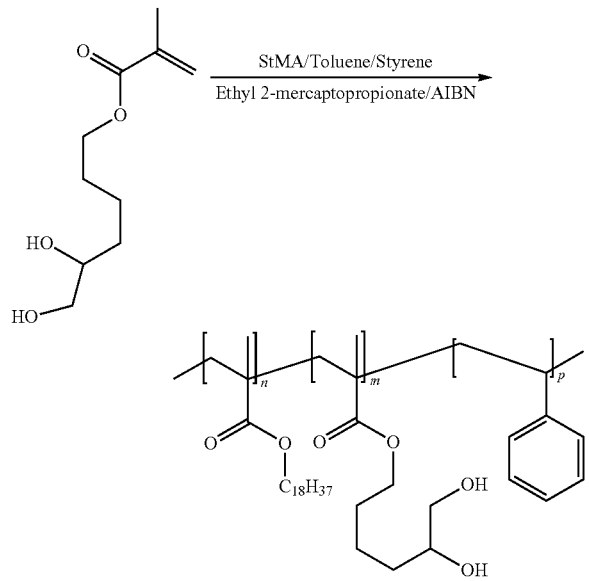

For the amounts introduced, refer to Table 1.1 below.

Stearyl methacrylate (StMA), methacrylate bearing a diol function (mono-Diol) and ethyl 2-mercaptopropionate (Solution 1) are placed in a 1 L reactor connected to a condenser, a thermometer and a nitrogen supply. The reaction medium is degassed by sparging with nitrogen and stirred until the temperature reaches 100° C. Next, 4 mL of a solution of azobisisobutyronitrile (AIBN) in toluene (Solution 3) is added to the reaction medium. Once evolution of gas has appeared, the styrene and the remainder of Solution 3 are added simultaneously over a period of 90 minutes. The reaction progress is monitored by SEC analysis. After 4 hours of polymerization at 100° C., the reaction medium is cooled to room temperature. The polymer is precipitated three times from 300 mL of methanol. The volatile substances are evaporated off under reduced pressure at a temperature below 50° C. The product is then dried under vacuum for 72 hours at 40° C. in order to remove the solvent residues. 59.1 g of a pasty white solid are obtained. Yield: 48%.

TABLE 1.1 amounts introduced for the synthesis of the oligomer o-Diol-4

| | Mass/Volume |
|---|---|
| Solution 1: | |
| StMA | 81.26 g |
| Mono-Diol | 6.12 g |
| Ethyl 2-mercaptopropionate | 1.20 g |
| Solution 2: | |
| Styrene | 34.39 g |

TABLE 1.1-continued amounts introduced for the synthesis of the oligomer o-Diol-4

| | Mass/Volume |
|---|---|
| Solution 3: | |
| AIBN | 0.26 g |
| Toluene | 35 mL |

Characterization:
The oligomer obtained comprises 11 mol % of repeating units containing diol functions, 38 mol % of StMA repeating units and 51 mol % of styrene repeating units as determined by $^1$H NMR (400 MHz, CDCl$_3$).

The oligomer has a number-average molar mass of approximately 6400 g·mol$^{-1}$ and a polydispersity index of 2.18 as determined by SEC in THF using poly(methyl methacrylate) calibration at 40° C.

1.2. Synthesis of the Boronic Ester Oligomer

1.2.1. Monomers

Monomer M4: Monomer Bearing a Boronic Ester Function (Mono-EB):
This synthesis is performed according to the protocol described in patent application WO 2016/113229 (experimental section § 2.1.).

1.2.2. Synthesis of the Oligomer o-EB-1

The synthesis of the oligomer o-EB-1 is performed according to the following reaction scheme:

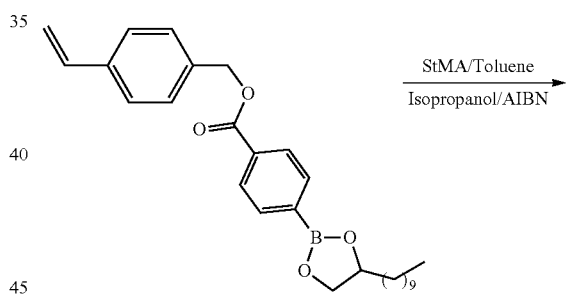

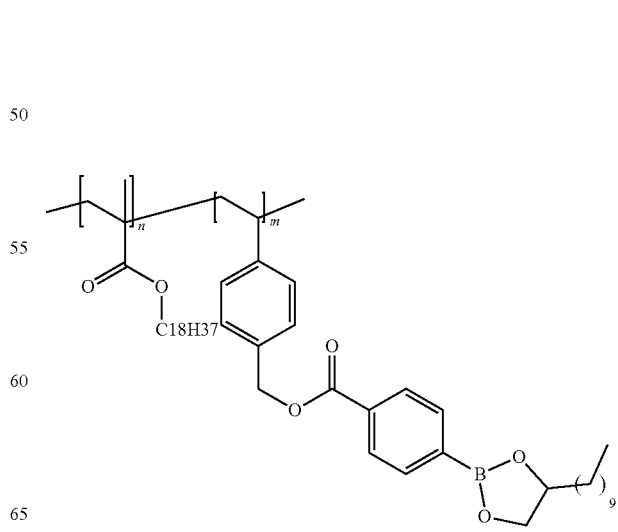

Stearyl methacrylate, the monomer bearing a boronic ester function (mono-EB), isopropanol, AIBN and toluene (Solution 4) are placed in a 500 mL reactor connected to a condenser, a thermometer and a nitrogen supply. The amounts introduced are presented in Table 1.3 below. The reaction medium is degassed by sparging with nitrogen for 30 minutes, stirred and then brought to 86° C. When the reaction medium is at 75° C. and when evolution of gas is observed, a solution of StMA and of mono-EB in toluene (Solution 5) is introduced dropwise over a period of 80 minutes. The reaction progress is monitored by SEC analysis. After 3 hours of polymerization at 80° C., the reaction medium is cooled to room temperature. The polymer is precipitated three times from 300 mL of methanol. The volatile substances are evaporated off under reduced pressure at a temperature below 50° C. The product is then dried under vacuum for 72 hours at 40° C. in order to remove the solvent residues. 115.6 g of a pasty white solid are obtained. Yield: 87%.

TABLE 1.3 amounts introduced for the synthesis of the oligomer o-EB-1

| | Mass/Volume |
|---|---|
| Solution 4: | |
| StMA | 11.95 g |
| mono-EB | 1.87 g |
| AIBN | 4.53 g |
| Toluene | 50 mL |
| Isopropanol | 200 mL |
| Solution 5: | |
| StMA | 104.19 g |
| mono-EB | 15.39 g |
| Toluene | 150 mL |

Characterization:

The oligomer obtained comprises 90 mol % of repeating units containing boronic ester functions and 10 mol % of StMA repeating units as determined by $^1$H NMR (400 MHz, CDCl$_3$).

The oligomer has a number-average molar mass of approximately 7100 g·mol$^{-1}$ and a polydispersity index of 1.74 as determined by SEC in THF using poly(methyl methacrylate) calibration at 40° C.

1.3. Synthesis of the Boronic Diester Molecule Di-EB

The synthesis of the molecule Di-EB is performed according to the following reaction scheme:

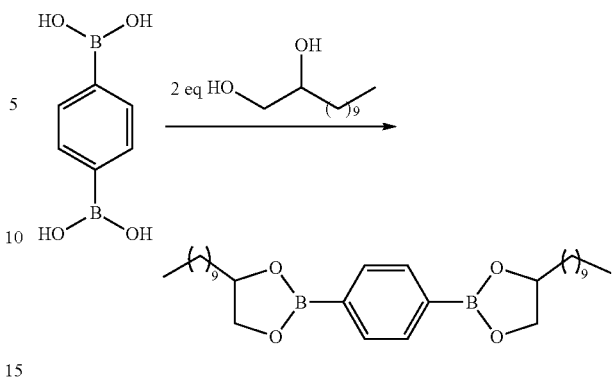

The following are introduced into a 500 mL three-necked round-bottomed flask connected to Dean-Stark apparatus, a condenser and a nitrogen supply: 38 mL of distilled water, 200 mL of toluene and 38.2 g of 1-phenylenediboronic acid. The mixture obtained is in the form of a solid in suspension. 93.1 g of 1,2-dodecanediol are then added. 200 mL of the remaining toluene are added so as to facilitate the rinsing of the walls of the three-necked flask. The reaction medium is then heated until the solid has dissolved. The medium is then placed under a nitrogen atmosphere, stirred and refluxed for 16 hours. The temperature of the reaction medium rises from 97° C. (boiling point of the water/toluene azeotrope) to 111° C. (boiling point of toluene). The water evaporated off azeotropically is removed regularly from the Dean-Stark apparatus. The reaction progress is monitored by monitoring the reflux temperature and the amount of water removed from the Dean-Stark apparatus.

After 16 hours, the reaction medium is cooled to room temperature. The volatile substances are evaporated off under reduced pressure below 30° C. The white solid obtained is dried using a rotary evaporator, for 2 hours. 108.1 g of a white solid are obtained. Yield=94%.

Characterization:

$^1$H NMR (400 MHz, Acetone-D6 with TCNB (2,3,4,5-tetrachloronitrobenzene)): Purity >99%.

1.4. Synthesis of the Polydiol Polymer p-Diol (Comparative)

The synthesis of the polydiol polymer p-Diol is performed according to the following reaction scheme:

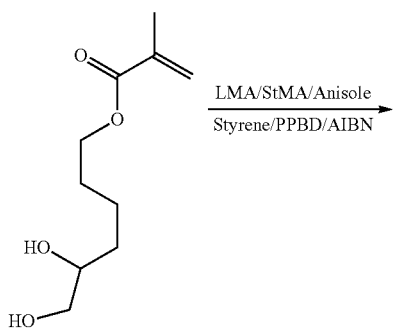

-continued

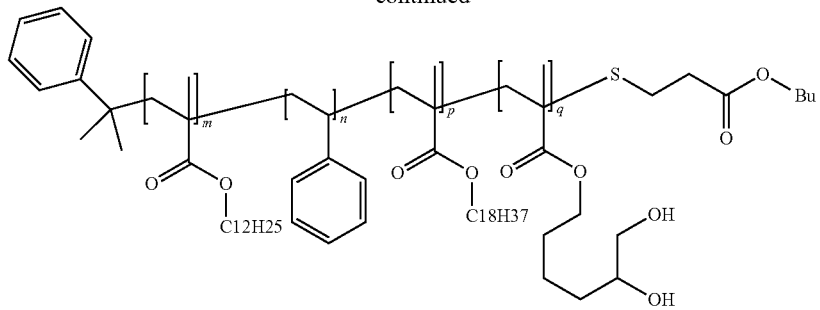

The following are introduced into a 4 L reactor connected to a condenser, a nitrogen supply and a 500 mL dropping funnel: 734.4 g of anisole, 36.2 g of cumyl dithiobenzoate solution, 45.3 g of lauryl methacrylate, 45.2 g of stearyl methacrylate, 9.3 g of styrene and 2.7 g of mono-Diol. 181.2 g of lauryl methacrylate, 180.9 g of stearyl methacrylate and 37.1 g of styrene are placed in the dropping funnel.

The reactor, the dropping funnel and the remainder of the mono-Diol (50.3 g) are placed under a nitrogen atmosphere. The reaction medium is heated with stirring to T=80° C. The reaction progress is monitored by SEC analysis. A solution of 0.2660 g of AIBN in 3 mL of anisole is introduced slowly over a period of 15 minutes. The rest of the mono-Diol is then introduced in a syringe pump, and the other monomers are introduced using the dropping funnel, over a period of about 30 hours.

Three solutions containing, respectively, 0.1362 g, 0.1338 g and 0.1450 g of AIBN in 3 mL of anisole are prepared and then introduced, respectively, at t=4 hours, t=25 hours and t=45 hours over a period of about 10 minutes. After 48 hours, the reaction medium is cooled to room temperature, and 150 mL of THF and 25 mL of n-butylamine are added. The reaction medium is maintained at room temperature for 4 hours, and 250 mL of butyl acrylate are then added. Stirring is continued for 18 hours at room temperature.

The product is then precipitated from 2 L of methanol and, after separation of the phases by settling, the supernatant is then discarded. The precipitated polymer is dissolved in THF and then precipitated again from 2 L of methanol. The operation is repeated a third time. The polymer is dissolved in a minimum volume of THF, and 1000 g of group III base oil are then added to the polymer. The residual solvents are removed by entrainment with nitrogen under mechanical stirring of the solution, and 1355.6 g of polydiol p-Diol are obtained. Degree of dilution=25.4% of polymer.

Characterization:

The polymer thus obtained and diluted comprises 68 mol % of StMA/lauryl MA repeating units, 25 mol % of styrene repeating units and 7 mol % of hexanediol MA (mono-Diol) repeating units as determined by $^{13}$C NMR (100 MHz, CDCl$_3$).

The polymer has a number-average molar mass of approximately 40 000 g·mol$^{-1}$ and a polydispersity index of 1.46 as determined by SEC in THF using poly(methyl methacrylate) calibration at 40° C.

1.5. Synthesis of Poly(Boronic Ester) Polymer p-EB (Comparative)

The synthesis of the poly(boronic ester) polymer p-EB is performed according to the following reaction scheme:

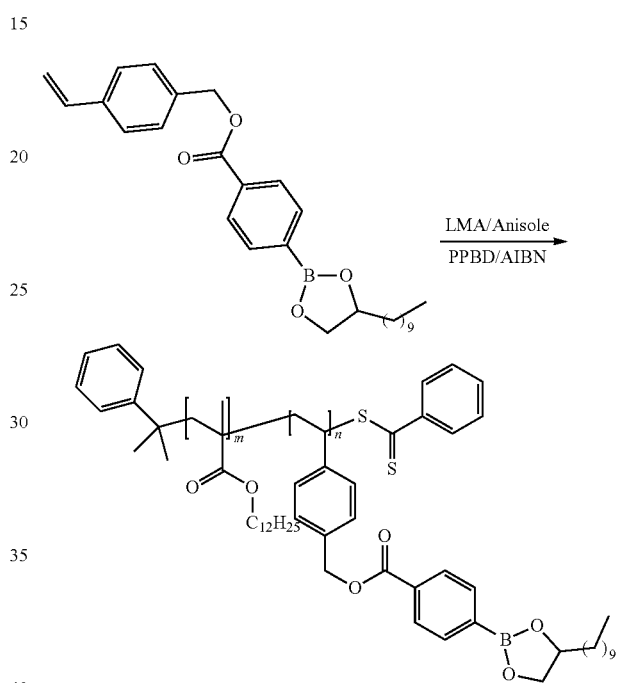

1 L of anisole, 3.56 g of a solution of cumyl dithiobenzoate, 900 g of lauryl methacrylate and 76 g of mono-EB are placed in a 2 L reactor connected to a condenser and to a nitrogen supply. The reaction medium is placed under a nitrogen atmosphere, stirred and heated to 90° C. The reaction medium is heated with stirring at T=90° C. The reaction progress is monitored by SEC analysis. After 2 hours 30 minutes of polymerization, the reaction medium is cooled to 0° C. and the product is precipitated from 4 L of acetone, and, after separation of the phases by settling, the supernatant is then removed. The precipitated polymer is dissolved in THF and then precipitated again from 4 L of acetone. The operation is repeated a final time. The polymer is then dissolved in a minimum volume of THF, and 900 g of group III base oil are then added to the polymer. The residual solvents are removed by entrainment with nitrogen under mechanical stirring of the solution, and 1381.0 g of poly(boronic ester) p-EB are obtained. Degree of dilution=39.2% of polymer.

Characterization:

The polymer thus obtained and diluted comprises 94 mol % of lauryl MA repeating units and 6 mol % of boronic ester repeating units as determined by $^{13}$C NMR (100 MHz, CDCl$_3$).

The polymer has a number-average molar mass of approximately 45 000 g·mol$^{-1}$ and a polydispersity index of 1.39 as determined by SEC in THF using poly(methyl methacrylate) calibration at 40° C.

2. Formulation of the Compositions

Each oligomer/polymer is dissolved in a base oil to obtain a solution containing 10% by mass of pure oligomer/polymer. After dissolution of the oligomer/polymer in the oil with magnetic stirring and heating at 80° C., these solutions are filtered, if need be, through a 0.8 μm Millipore filter. They serve as stock solutions for the preparation of the formulations below.

2.1. Lubricant Base Oil

The lubricant base oil used in the test compositions is an oil from group III of the API classification, sold by SK under the name Yubase 4+.

It has the following characteristics:
- its kinematic viscosity at 40° C. measured according to the standard ASTM D445 is 18.51 cSt;
- its kinematic viscosity measured at 100° C. according to the standard ASTM D445 is 4.206 cSt;
- its viscosity index measured according to the standard ASTM D2270 is 135;
- its Noack volatility, as a weight percentage, measured according to the standard CEC L-40-93, is 13.4% by mass;
- its flash point in degrees Celsius, measured according to the standard NF EN ISO 2592, is 234° C.;
- its pour point in degrees Celsius, measured according to the standard NF T60-105, is −18° C.

2.2. Preparation of Composition A (According to the Invention)

8.00 g of the stock solution containing 10% by mass of boronic ester oligomer o-EB-1 and 8.00 g of the stock solution containing 10% by mass of the oligomer o-Diol-4 are placed in a flask and mixed with a magnetic stirrer for 5 minutes. This formulation thus contains 5% by mass of boronic ester oligomer o-EB-1 and 5% by mass of oligomer o-Diol-4.

2.3. Preparation of Composition B (According to the Invention)

The amount of the compounds of the preparation is adjusted so that this formulation contains 5% by mass of the boronic diester molecule Di-EB and 10% by mass of oligomer o-Diol-4.

2.4. Preparation of Composition F (Comparative)

5.2 g of the stock solution containing 10% by mass of the poly(boronic ester) polymer p-EB, 4.5 g of the stock solution containing 10% by mass of the polydiol polymer p-Diol and 10.3 g of group III base oil are placed in a flask and mixed with a magnetic stirrer for 5 minutes. This formulation thus contains 2.6% by mass of poly(boronic ester) p-EB and 2.25% by mass of polydiol p-Diol.

3. Rheological Studies

3.1. Measurement Apparatus and Protocols

Shear Measurements:
The low-shear (10, 100, 1000, 5000 and 10000 s$^{-1}$) dynamic viscosities were measured at 40° C., 100° C. and 150° C. in a stabilized regime with a DHR-2 rheometer from the company TA Instruments, equipped with cone-plate geometry (0.5°-40 mm).

The high-shear (1, 2, 3, 4·10$^6$ s$^{-1}$ at 40° C. and 1, 4, 7, 10·10$^6$ s$^{-1}$ at 100° C. and 150° C.) dynamic viscosities were measured with a USV high-shear viscometer from the company PCS Instruments.

Mechanical Degradation Test:
The KRL mechanical degradation test was performed at 60° C. for 20 hours according to the standard CEC L-45-A-99 and the kinematic viscosities were measured before and after the KRL test. The kinematic viscosity of compositions A, F and of the group III base oil were measured at 40° C. and 100° C. with a capillary viscometer from the company Herzog according to the standard ASTM D445.

Kinematic Viscosity Measurements:
The kinematic viscosity of composition B and of the group III base oil were measured at 40° C. and 100° C. with a capillary viscometer from the company Herzog according to the standard ASTM D445.

3.2. Results

Shear Measurements:
FIGS. 5, 6 and 7 show the curves of variation in dynamic viscosity measured as a function of the shear rate at, respectively, 40, 100 and 150° C. for compositions A according to the invention and composition F.

When the shear rate is low (up to 10 000 s$^{-1}$), the rheological behavior of formulations A and F is identical. When a high shear rate is applied, composition F shows a significant drop in dynamic viscosity; this behavior shows poor shear strength of the high molar mass polymers. Composition A, comprising the combination of oligomers according to the invention, shows stability of the viscosity at a high shear rate at 40 and 100° C., and even at high temperature up to 150° C. This illustrates the technical effect of the capacity of the claimed oligomer mixture of thickening the medium in which it is dispersed and of conserving this capacity under shear at high temperatures.

Mechanical Degradation:
The kinematic viscosity of compositions A and F was measured at 40 and 100° C. before and after the KRL 20-hour mechanical degradation test. The results obtained are collated in table 2.1.

TABLE 2.1

Results of kinematic viscosity measurement at 40 and 100° C. before and after the KRL 20-hour mechanical degradation test for composition A according to the invention and composition F.

| | Group III base oil | Composition A | Composition F |
|---|---|---|---|
| Initial kinematic viscosities measured | | | |
| KV40 in mm$^2$/s | 18.51 | 27.52 | 31.95 |
| KV100 in mm$^2$/s | 4.206 | 6.054 | 8.765 |
| VI | 135 | 177 | 274 |
| Kinematic viscosities measured after KRL shear test | | | |
| KV40 in mm$^2$/s | | 27.22 | 26.16 |
| KV100 in mm$^2$/s | | 5.956 | 6.135 |
| VI | | 174 | 196 |
| PSSI 40 in % | | 3 | 43 |
| PSSI 100 in % | | 5 | 58 |

Composition F comprising 2.6% by mass of poly(boronic ester) p-EB and 2.25% by mass of polydiol p-Diol shows an irreversible loss of viscosity after shear for temperatures of 40 and 100° C. When composition A, containing the combination of oligomers o-Diol-4 and o-EB-1 according to the invention is used, no significant loss of viscosity is observed. This composition still conserves its properties for high temperatures. These results show better resistance to mechanical degradation of composition A according to the invention compared with composition F comprising high molar mass polymers.

The shear stability characterized by the PSSI (permanent shear stability index) was calculated from the kinematic viscosities of the compositions in oil after the KRL 20-hour shear process at 40 and at 100° C., according to the following mathematical formula:

PSSI=[(initial KV−KV after KRL)/(initial KV−KV base oil)]×100

Composition F has a permanent shear stability index of greater than 40%. This indicates that certain high molar mass polymer molecules are destroyed under mechanical shear stress, leading to an irreversible loss of viscosity of the formulation studied. On the other hand, composition A has a low PSSI of 3% at 40° C. and of 5% at 100° C. This shows the sparingly shear-sensitive behavior of the formulations according to the invention and their resistance to mechanical degradation.

Kinematic Viscosity Measurements:

The kinematic viscosity of composition B and of the group III base oil were measured at 40° C. and 100° C. The results obtained are collated in table 2.2.

Composition B comprising 5% by mass of the boronic diester molecule Di-EB and 10% by mass of the oligomer o-Diol-4 shows an increased kinematic viscosity at and 100° C. The increase in viscosity is more particularly observed when hot: the viscosity index is thus greatly improved.

TABLE 2.2

Results of kinematic viscosity measurement at 40 and 100° C. for composition B according to the invention

| Kinematic viscosities measured | Group III base oil | Composition B |
| --- | --- | --- |
| KV40 in mm²/s | 18.51 | 29.76 |
| KV100 in mm²/s | 4.206 | 6.345 |
| VI | 135 | 172 |

The invention claimed is:

1. A composition resulting from the mixing of at least a polydiol oligomer A1 with a number-average molar mass of greater than or equal to 600 g/mol and less than 10,000 g/mol, comprising repeating units corresponding to:

at least two monomers M1, and more than 50 mol % of repeating units corresponding to one or more monomers M3, and optionally at least one monomer M2, and a compound A2 comprising at least two boronic ester functions, the monomer M1 corresponding to the general formula (I):

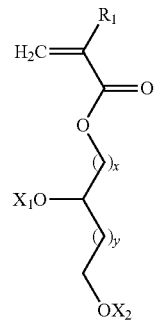

in which:

$R_1$ is chosen from the group formed by —H, —$CH_3$ and —$CH_2$—$CH_3$;

x is an integer ranging from 1 to 18;

y is an integer equal to 0 or 1;

$X_1$ and $X_2$, which may be identical or different, are chosen from the group formed by hydrogen, tetrahydropyranyl, methyloxymethyl, tert-butyl, benzyl, trimethylsilyl and t-butyldimethylsilyl;

or $X_1$ and $X_2$ form, with the oxygen atoms, a bridge having the following formula

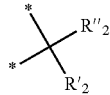

in which:

the asterisks (*) symbolize the bonds to oxygen atoms, $R'_2$ and $R''_2$, which may be identical or different, are chosen from the group formed by hydrogen and a $C_1$-$C_{11}$ alkyl;

or $X_1$ and $X_2$ form, with the oxygen atoms, a boronic ester having the following formula:

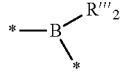

in which:

the asterisks (*) symbolize the bonds to oxygen atoms, $R'''_2$ is chosen from the group formed by a $C_6$-$C_{30}$ aryl, a $C_7$-$C_{30}$ aralkyl and a $C_2$-$C_{30}$ alkyl;

the monomer M2 corresponding to the general formula (II):

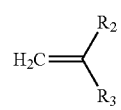

in which:

$R_2$ is chosen from the group formed by —H, —$CH_3$ and —$CH_2$-$CH_3$;

$R_3$ is chosen from the group formed by: —C(O)—$OR'_3$; —O—$R'_3$; —S—$R'_3$ and —C(O)—N(H)—$R'_3$ with $R'_3$ a $C_1$-$C_{30}$ alkyl group, the monomer M3 corresponding to the general formula (X):

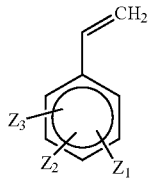
(X)

in which:
Z₁, Z₂ and Z₃, which may be identical or different, represent groups chosen from a hydrogen atom, a $C_1$-$C_{12}$ alkyl, and a group —OZ' or —C(O)—O—Z' with Z' being a $C_1$-$C_{12}$ alkyl.

2. The composition as claimed in claim 1, in which the oligomer A1 has a number-average molar mass ranging from 600 g/mol to 9500 g/mol.

3. The composition as claimed in claim 1, in which A1 comprises from 55 mol % to 95 mol % of repeating units corresponding to one or more monomers M3 of general formula (X).

4. The composition as claimed in claim 1, in which the monomer M3 is styrene.

5. The composition as claimed in claim 1, in which the side chains of the oligomer A1 have a mean length ranging from 8 to 20 carbon atoms.

6. The composition as claimed in claim 1, in which the oligomer A1 has a molar percentage of repeating units corresponding to the monomer M1 of formula (I) ranging from 1% to less than 50%.

7. The composition as claimed in claim 1, in which the oligomer A1 has a number-average degree of polymerization ranging from 3 to 100.

8. The composition as claimed in claim 1, in which the oligomer A1 has a polydispersity index (Ip) ranging from 1.05 to 4.0.

9. The composition as claimed in claim 1, in which compound A2 is a compound of formula (III):

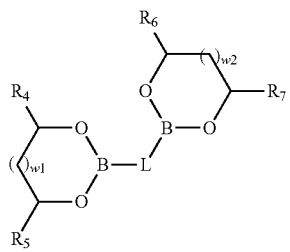
(III)

in which:
$w_i$ and $w_2$, which may be identical or different, are integers chosen between 0 and 1;
$R_4$, $R_5$, $R_6$ and $R_7$, which may be identical or different, represent a group chosen from a hydrogen atom, a hydrocarbon-based group comprising from 1 to 30 carbon atoms, optionally substituted with one or more groups chosen from: a hydroxyl, a group —OJ or —C(O)—O—J with J being a hydrocarbon-based group comprising from 1 to 24 carbon atoms;

L is a divalent bonding group chosen from the group formed by a $C_6$-$C_{18}$ aryl, a $C_6$-$C_{18}$ aralkyl and a $C_2^-C_{24}$ hydrocarbon-based chain.

10. The composition as claimed in claim 1, in which compound A2 is an oligomer comprising repeating units which correspond to
at least two monomers M4 of formula (IV):

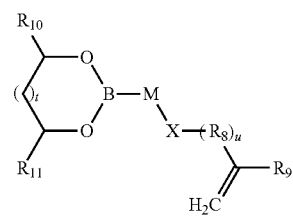
(IV)

in which:
t is an integer equal to 0 or 1;
u is an integer equal to 0 or 1;
M and $R_8$ are identical or different divalent bonding groups, chosen from the group formed by a $C_6$-$C_{18}$ aryl, a $C_7^-C_{24}$ aralkyl and a $C_2^-C_{24}$ alkyl, X is a function chosen from the group formed by —O—C(O)—, —C(O)—O—, —C(O)—N(H)—, —N(H)—C(O)—, —S—, —N(H)—, —N(R'₄)— and —O— with R'₄ being a hydrocarbon-based chain comprising from 1 to 15 carbon atoms;
$R_9$ is chosen from the group formed by —H, —CH₃ and —CH₂—CH₃;
$R_{10}$ and $R_{11}$, which may be identical or different, represent a group chosen from a hydrogen atom, a hydrocarbon-based group comprising from 1 to 30 carbon atoms, optionally substituted with one or more groups chosen from: a hydroxyl, a group —OJ or —C(O)—O—J with J being a hydrocarbon-based group comprising from 1 to 24 carbon atoms; and
optionally at least one monomer M5 of general formula (V):

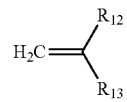

in which:
$R_{12}$ is chosen from the group formed by —H, —CH₃ and —CH₂—CH₃,
$R_{13}$ is chosen from the group formed by —C(O)-13 O—R'₁₃; —O—R'₁₃, —S—R'₁₃ and —C(O)—N(H)— R'₁₃, with R'₁₃ a $C_1$-$C_{30}$ alkyl group,
optionally at least one monomer M3 of general formula (X)

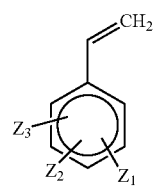
(X)

in which:

$Z_1$, $Z_2$ and $Z_3$, which may be identical or different, represent groups chosen from a hydrogen atom, a $C_1$-$C_{12}$ alkyl, and a group —OZ' or —C(O)—O—Z' with Z' being a $C_1$-$C_{12}$ alkyl.

11. The composition as claimed in claim 10, in which the oligomer A2 has a number-average molar mass ranging from 600 g/mol to less than 10,000 g/mol.

12. The composition as claimed in claim 10, in which the oligomer A2 has a molar percentage of monomer M4 of formula (IV) in said oligomer ranging from 4% to 50%.

13. The composition as claimed in claim 10, in which, the chain formed by the sequence of groups $R_{10}$, M, X and $(R_8)_u$, with u equal to 0 or 1 of the monomer of formula (IV) has a total number of carbon atoms ranging from 8 to 38.

14. The composition as claimed in claim 10, in which the side chains of the oligomer A2 have a mean length of greater than or equal to 8 carbon atoms.

15. The composition as claimed in claim 10, in which the oligomer A2 has a polydispersity index (Ip) ranging from 1.04 to 3.54.

16. The composition as claimed in claim 1, in which the content of oligomer A1 ranges from 0.1% to 50% by weight relative to the total weight of the composition.

17. The composition as claimed in claim 1, in which the content of oligomer A2 ranges from 0.1% to 50% by weight relative to the total weight of the composition.

18. The composition as claimed in claim 1, in which the mass ratio between the oligomer A1 and compound A2 (ratio A1/A2) ranges from 0.002 to 500.

19. A lubricant composition resulting from the mixing of at least:

a lubricant oil; and a composition as defined in claim 1.

20. A process for reducing the fuel consumption of a vehicle, comprising at least one step of placing a mechanical part of the vehicle engine in contact with a lubricant composition as claimed in claim 19.

* * * * *